US012489968B2

(12) United States Patent
Sakurai et al.

(10) Patent No.: US 12,489,968 B2
(45) Date of Patent: Dec. 2, 2025

(54) IMAGE PROCESSING DEVICE, METHOD, AND STORAGE MEDIUM

(71) Applicant: KABUSHIKI KAISHA TOSHIBA, Tokyo (JP)

(72) Inventors: Shunsuke Sakurai, Kawasaki (JP); Masako Kashiwagi, Kawasaki (JP); Akihito Seki, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 468 days.

(21) Appl. No.: 17/903,176

(22) Filed: Sep. 6, 2022

(65) Prior Publication Data
US 2023/0141542 A1 May 11, 2023

(30) Foreign Application Priority Data
Nov. 8, 2021 (JP) ................................. 2021-181736

(51) Int. Cl.
*H04N 23/60* (2023.01)
*G06T 7/50* (2017.01)
*G06T 7/60* (2017.01)

(52) U.S. Cl.
CPC .............. *H04N 23/64* (2023.01); *G06T 7/50* (2017.01); *G06T 7/60* (2013.01); *G06T 2207/20081* (2013.01); *G06T 2207/30168* (2013.01)

(58) Field of Classification Search
CPC .... H04N 23/64; H04N 23/617; H04N 23/695; G06T 7/50; G06T 7/60; G06T 2207/20081; G06T 2207/30168
See application file for complete search history.

(56) References Cited

U.S. PATENT DOCUMENTS 11,663,734 B2 * 5/2023 Schoen .................. G06V 20/52
 348/135
11,758,272 B2 * 9/2023 Lin ...................... H04N 23/611
 396/89
(Continued)

FOREIGN PATENT DOCUMENTS

JP 2000-310531 A 11/2000
JP 2001-255118 A 9/2001
(Continued)

OTHER PUBLICATIONS

Kashiwagi, M. et al., "Deep Depth from Aberration Map", 2019 IEEE/CVF International Conference on Computer Vision (ICCV), 2019, 10 pages.
(Continued)

*Primary Examiner* — Gelek W Topgyal
(74) *Attorney, Agent, or Firm* — Oblon, McClelland, Maier & Neustadt, L.L.P.

(57) ABSTRACT

According to one embodiment, an image processing device is used when measuring a capture distance from a capture device to a subject in an image using an image captured by the capture device and affected by aberration of an optical system of the capture device. The image processing device includes a processor. The processor is configured to acquire an image captured by the capture device, acquire configuration information relating to an optical system of the capture device, acquire a capture distance with respect to the image based on the acquired image, create a first capture condition of an image suitable for measuring a distance to the subject based on the acquired configuration information and the acquired capture distance, and output the created first capture condition.

12 Claims, 21 Drawing Sheets

(56) References Cited

U.S. PATENT DOCUMENTS

| | | | |
|---|---|---|---|
| 2011/0221888 A1 | 9/2011 | Choi et al. | |
| 2013/0321619 A1* | 12/2013 | Lee | G01C 3/32 |
| | | | 348/135 |
| 2018/0247451 A1* | 8/2018 | Blumer | G06T 7/579 |
| 2018/0270413 A1 | 9/2018 | Sakashita et al. | |
| 2019/0339067 A1* | 11/2019 | Sanami | G06T 7/55 |
| 2020/0034989 A1* | 1/2020 | Koyama | H04N 17/002 |
| 2020/0092464 A1 | 3/2020 | Kozakaya et al. | |
| 2020/0120268 A1* | 4/2020 | Osawa | H04N 23/64 |
| 2020/0294260 A1* | 9/2020 | Kashiwagi | G06T 7/571 |
| 2021/0084238 A1* | 3/2021 | Kashiwagi | H04N 23/617 |
| 2021/0368152 A1* | 11/2021 | Nishibe | G06F 3/011 |
| 2022/0300757 A1* | 9/2022 | Tsuruyama | G06V 20/56 |

FOREIGN PATENT DOCUMENTS

| | | |
|---|---|---|
| JP | 2005-228778 A | 8/2005 |
| JP | 2015-132546 A | 7/2015 |
| JP | 2018-156617 A | 10/2018 |
| JP | 2020-48034 A | 3/2020 |
| JP | 2020-148483 A | 9/2020 |
| JP | 2021-43115 A | 3/2021 |
| JP | 2021-44749 A | 3/2021 |

OTHER PUBLICATIONS

Japanese Office Action issued Nov. 19, 2024 in Japanese Patent Application No. 2021-181736 (with unedited computer-generated English translation) 6 pages.

\* cited by examiner

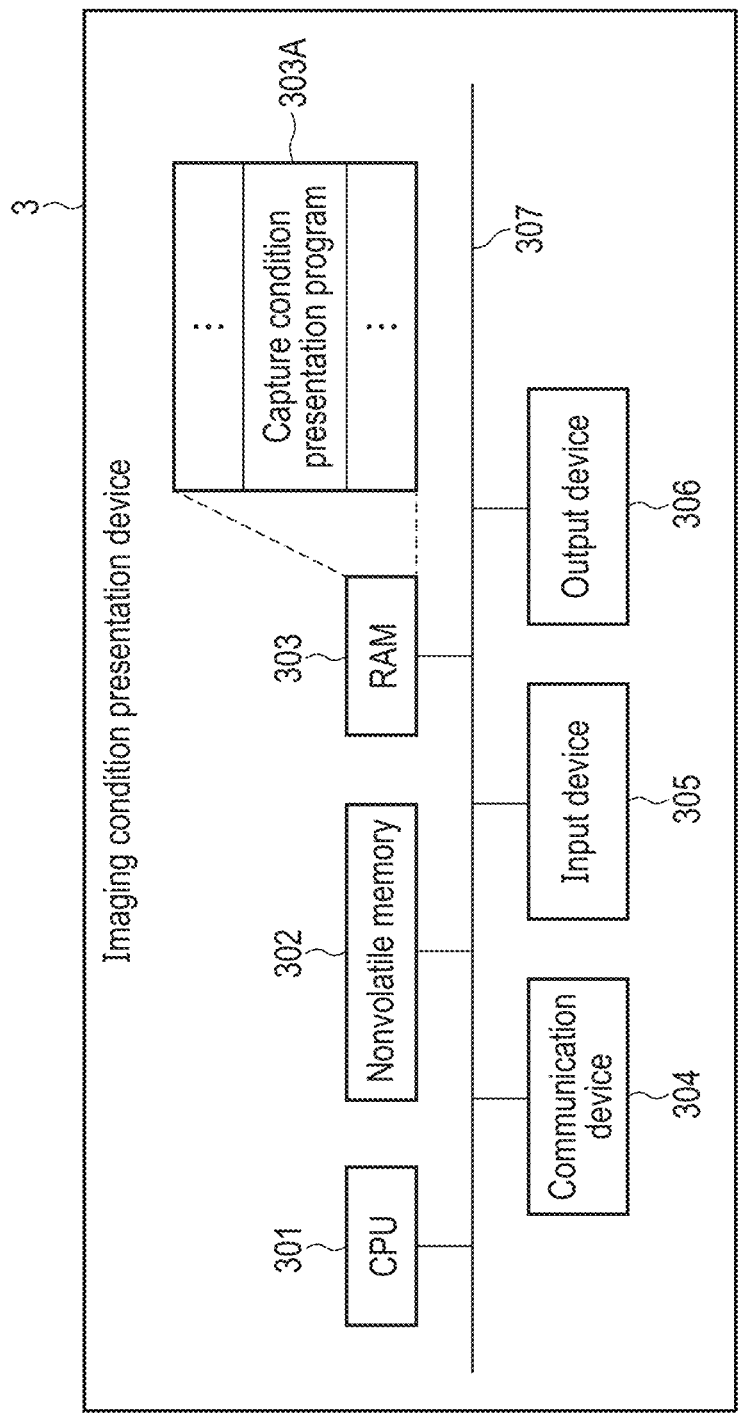
F I G. 2
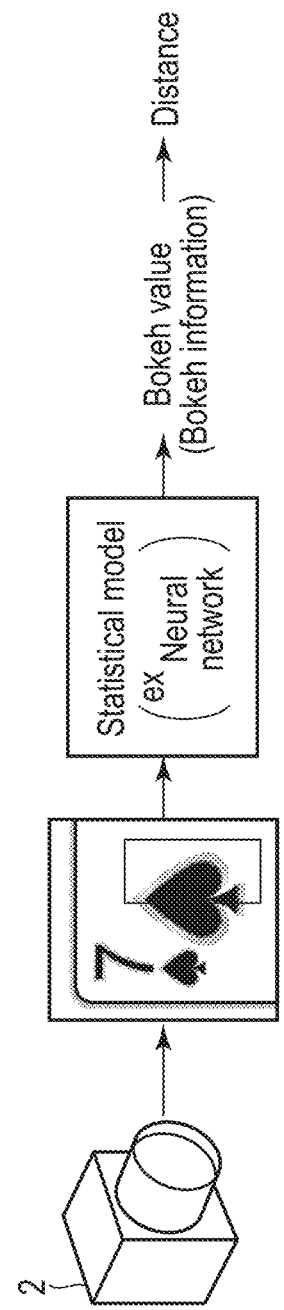
F I G. 3

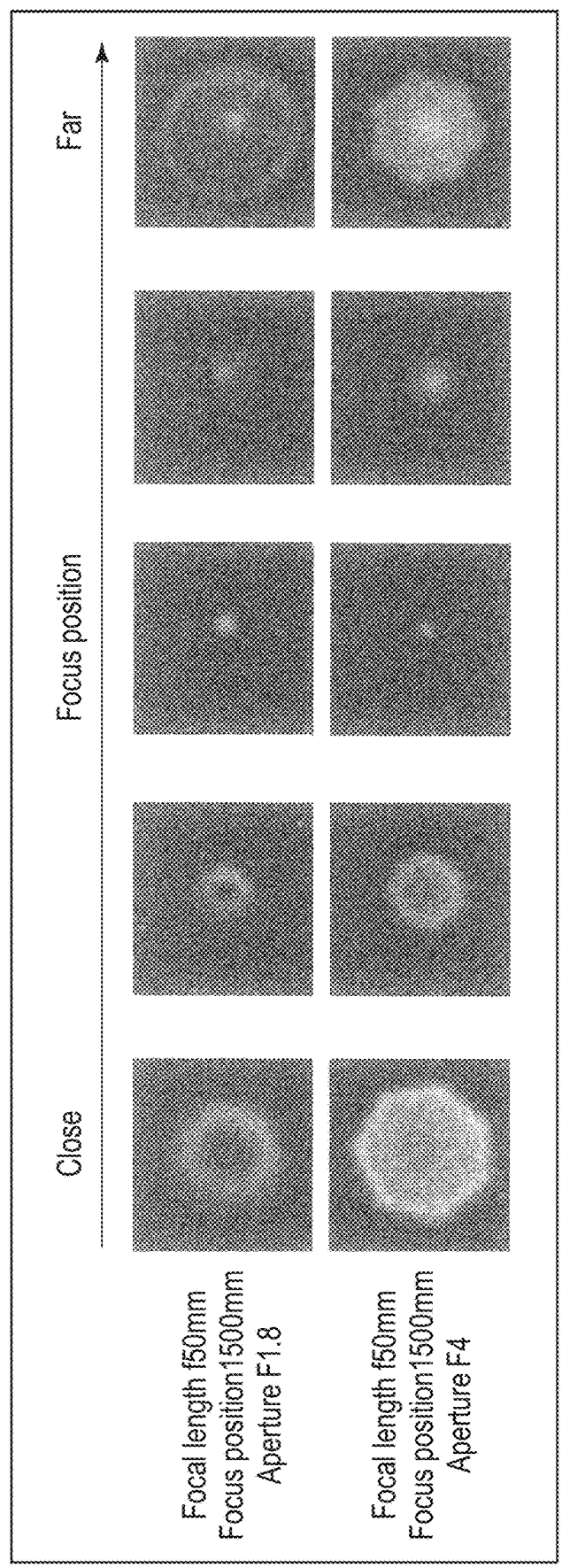
F I G. 6

| Focal length / Position | f24mm | f35mm | f50mm #1 | f50mm #2 | f85mm #1 | f85mm #2 |
|---|---|---|---|---|---|---|
| Near center of image — Close | | | | | | |
| Near center of image — Far | | | | | | |
| Near edge of image — Close | | | | | | |
| Near edge of image — Far | | | | | | |

FIG. 10

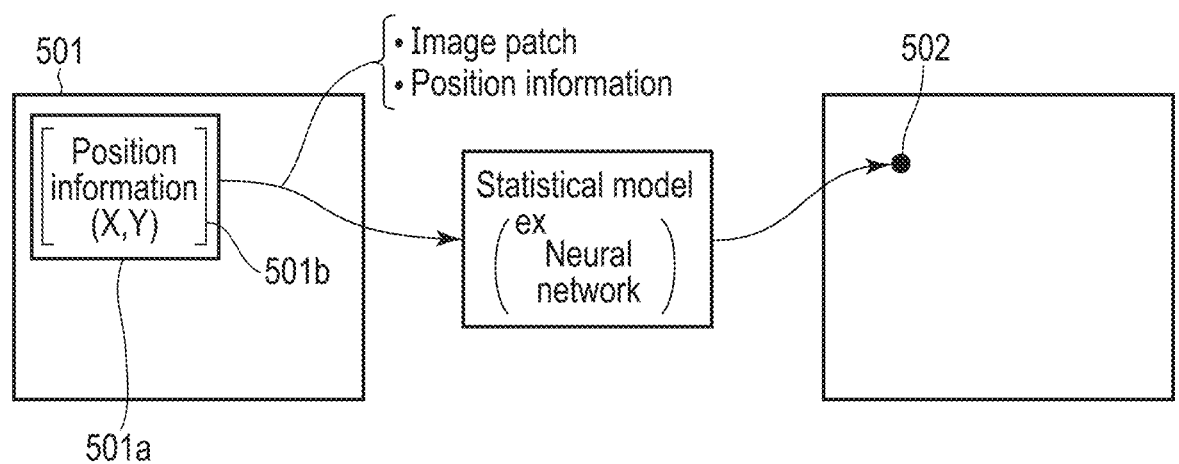
F I G. 14

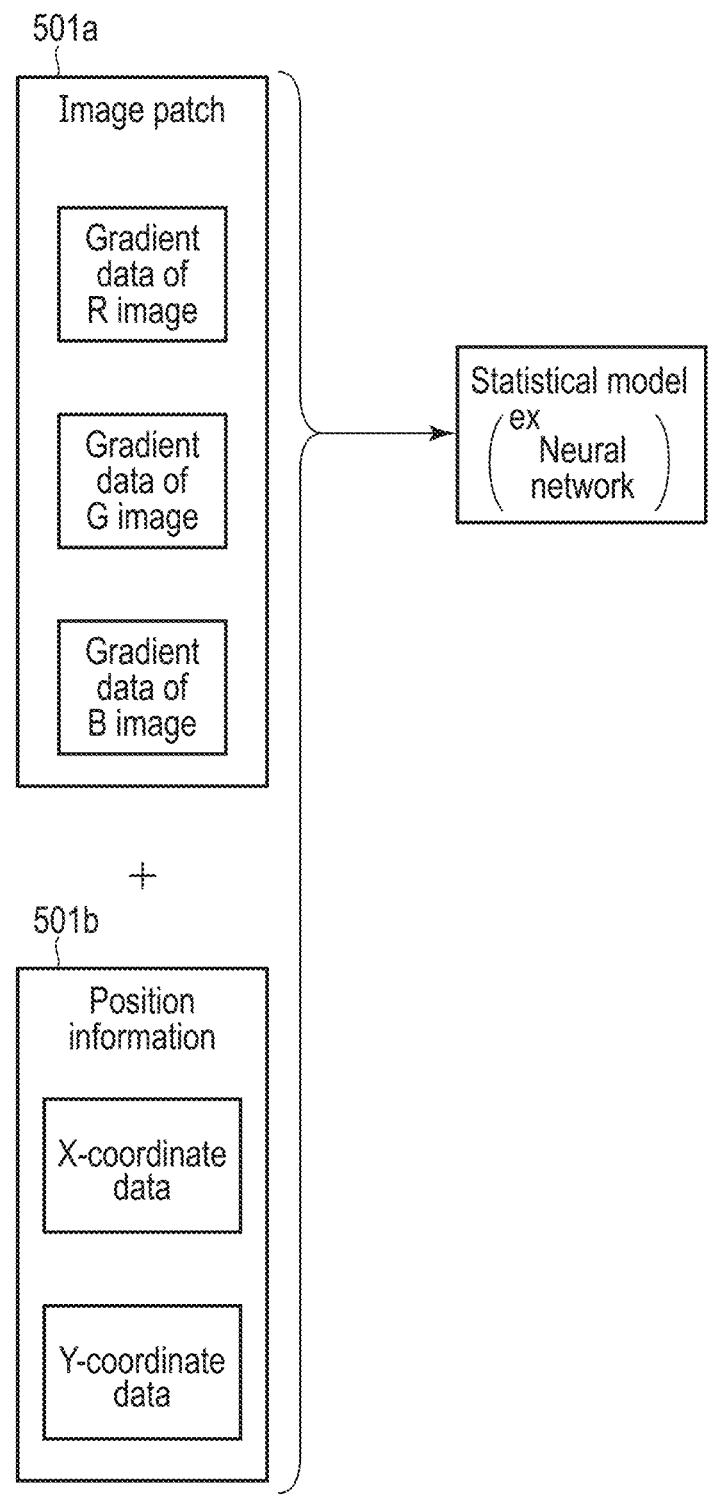
F I G. 15

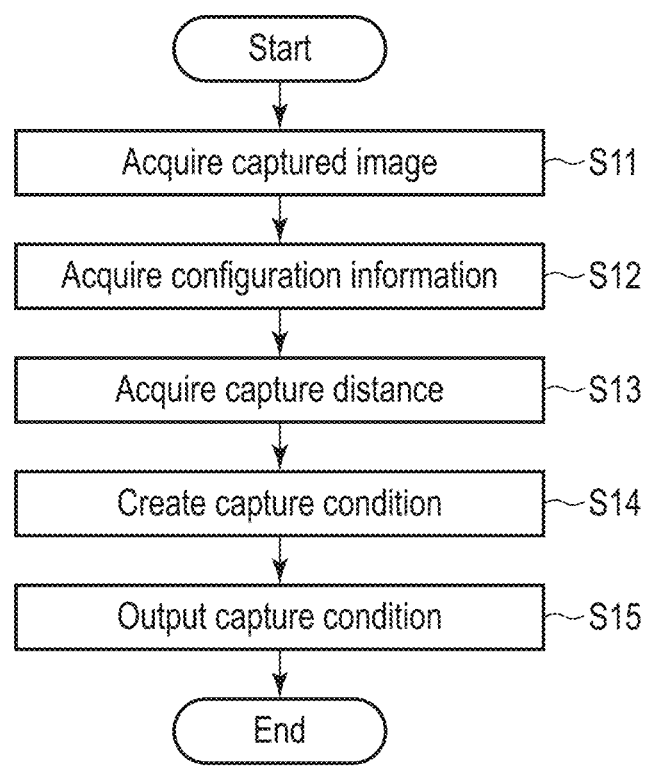
F I G. 20

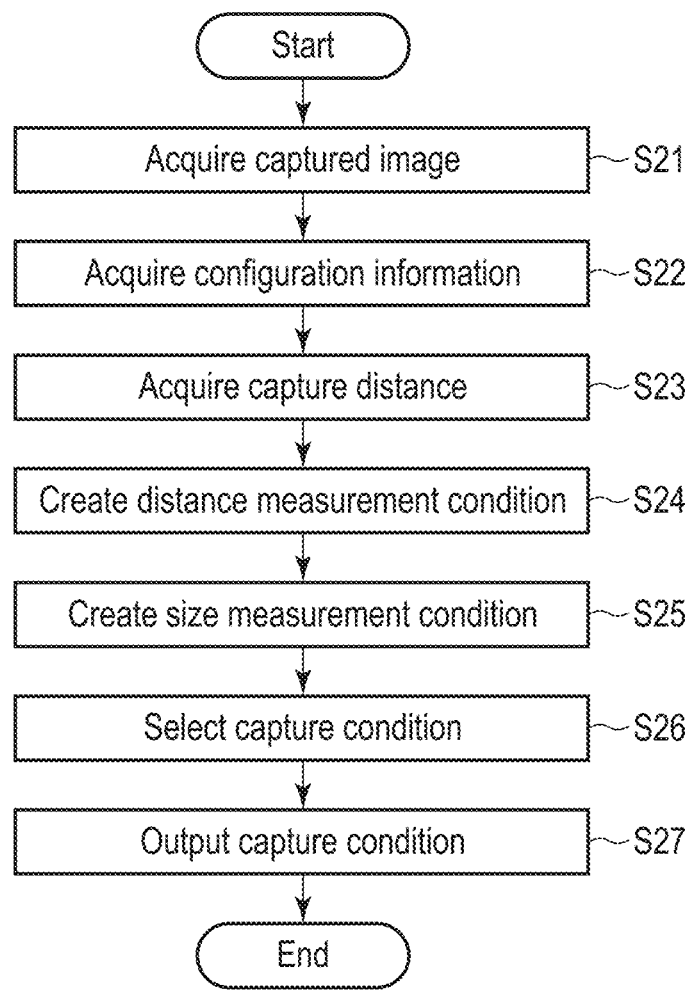
F I G. 22

IMAGE PROCESSING DEVICE, METHOD, AND STORAGE MEDIUM

CROSS-REFERENCE TO RELATED APPLICATIONS

This application is based upon and claims the benefit of priority from Japanese Patent Application No. 2021-181736, filed Nov. 8, 2021, the entire contents of which are incorporated herein by reference.

FIELD

Embodiments described herein relate generally to an image processing device, a method, and a storage medium.

BACKGROUND

Generally, it has been known to use images captured by two capture devices (cameras) or stereo cameras (compound eye cameras) to measure (acquire) the distance to a subject. However, in recent years, a technique for measuring the distance to a subject using images captured by a single capture device (monocular camera) has been disclosed.

However, while measuring the distance to a subject from an image captured by a single capture device (i.e., measuring the distance using a single image captured by a monocular camera) is highly convenient, it is necessary to adjust the capture conditions to improve the accuracy of the distance measurement.

BRIEF DESCRIPTION OF THE DRAWINGS

FIG. 2 shows an example of a system configuration of a capture condition presentation device.

FIG. 3 illustrates an overview of a statistical model.

FIG. 6 shows a relationship between the size of an aperture of a diaphragm mechanism provided in an optical system of a capture device and a PSF shape.

FIG. 10 specifically illustrates positional dependency of the PSF shape according to the type of lens.

FIG. 14 illustrates a second method for estimating bokeh from an image.

FIG. 15 shows an example of information input to a statistical model in the second method.

FIG. 20 is a flowchart showing an example of a processing procedure of the capture condition presentation device.

FIG. 22 is a flowchart showing an example of a processing procedure of the capture condition presentation device.

DETAILED DESCRIPTION

In general, according to one embodiment, an image processing device is used when measuring a capture distance from a capture device to a subject in an image using an image captured by the capture device and affected by aberration of an optical system of the capture device. The image processing device includes a processor. The processor is configured to acquire an image captured by the capture device, acquire configuration information relating to an optical system of the capture device, acquire a capture distance with respect to the image based on the acquired image, create a first capture condition of an image suitable for measuring a distance to the subject based on the acquired configuration information and the acquired capture distance, and output the created first capture condition.

Various embodiments will be described with reference to the accompanying drawings.

(First Embodiment)

First, a first embodiment will be described.

Figure 1:
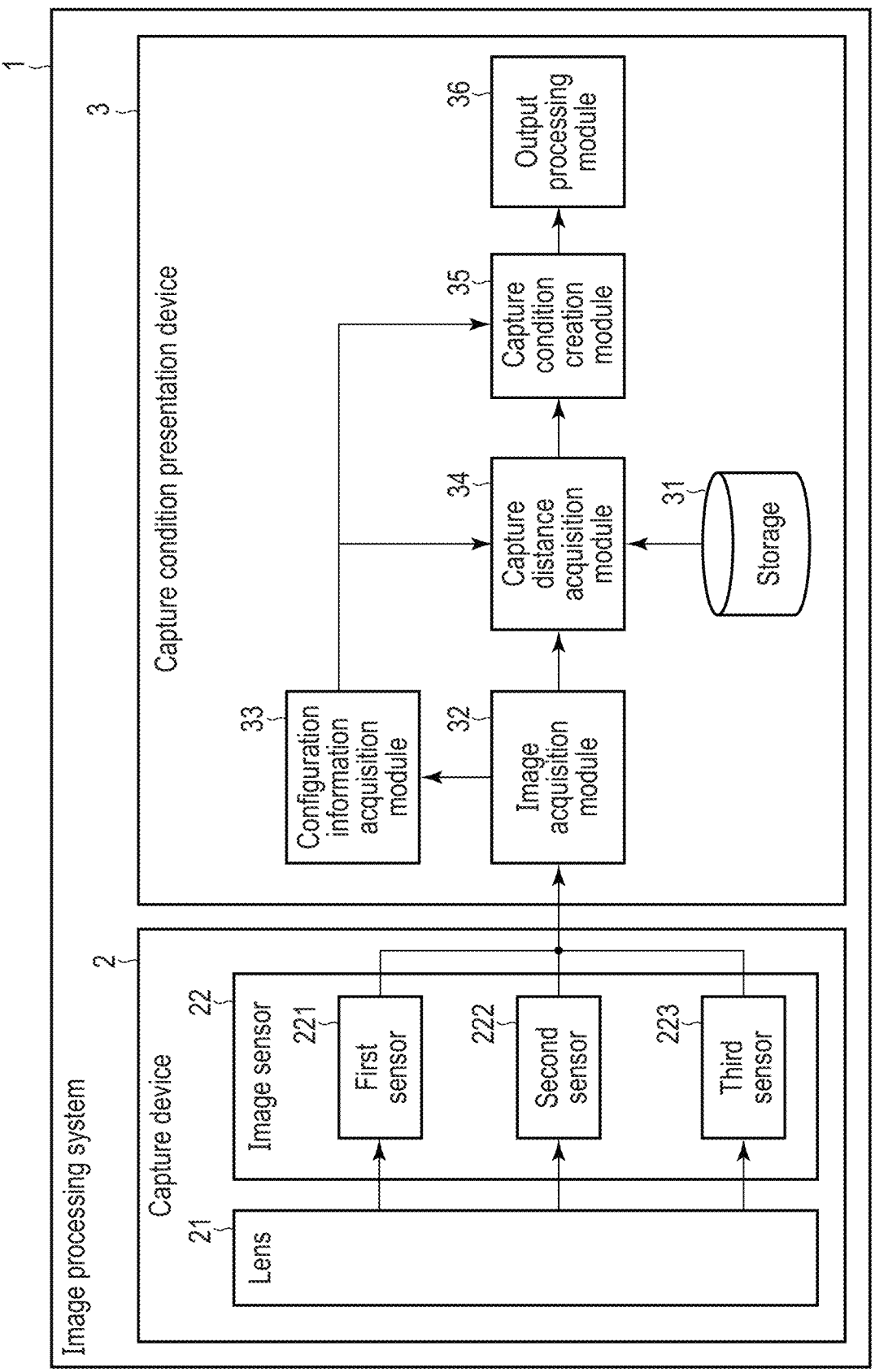
FIG. 1 shows an example of a configuration of an image processing system in a first embodiment.

FIG. 1 shows an example of a configuration of an image processing system in the present embodiment. As shown in FIG. 1, an image processing system 1 includes a capture device 2 and a capture condition presentation device (image processing device) 3.

The capture condition presentation device 3 according to the present embodiment is used to present capture conditions of an image when measuring a distance from an imaging point to a subject using an image captured by the capture device 2 (i.e., to suggest capture conditions of an image suitable for measuring the distance).

Note that, in the present embodiment, the image processing system 1 is described as including the capture device 2 and the capture condition presentation device 3, which are separate devices. However, the image processing system 1 may be realized as a single device in which the capture device 2 functions as a capture unit, and the capture condition presentation device 3 functions as a capture condition presentation unit. In the case where the image processing system 1 is configured to include the capture device 2 and the capture condition presentation device 3, which are separate devices, for example, a digital camera or the like may be used as the capture device 2, and a personal computer, a smart phone, a tablet computer, or the like may be used as the capture condition presentation device 3. In this case, the capture condition presentation device 3 may, for example, operate as a server device executing a cloud computing service. On the other hand, in the case where the image processing system 1 is realized as a single device, a digital camera, a smartphone, or a tablet computer, etc., can be used as the image processing system 1.

Furthermore, in a case where the capture conditions of an image are improved using the capture condition presentation device 3 as described above, the distance to a subject is measured from the image captured by the capture device 2 according to the improved capture conditions; however, a process of measuring the distance to the subject will be executed by a device separate from the capture condition presentation device 3 (hereinafter referred to as a ranging device). Note that the ranging device may be realized as a single device equipped with the capture device 2, or may be configured integrally with the capture condition presentation device 3.

The capture device 2 is used to capture various images. The capture device 2 includes a lens 21 and an image sensor 22. The lens 21 and the image sensor 22 correspond to an optical system (monocular camera) of the capture device 2. In the present embodiment, the lens 21 configures a lens unit together with a mechanism and a lens drive circuit, etc., for controlling a focus position (focal length) by adjusting the position of the lens 21, a diaphragm mechanism and a diaphragm control circuit, etc., having an aperture for adjusting the amount of light (incident light quantity) taken into the optical system of the capture device 2, and a control circuit, etc., in which a memory holding information relating to the lens 21 and other configuration information relating to the optical system (hereinafter referred to as configuration information of the capture device 2) of the capture device 2 is mounted.

In the present embodiment, the capture device 2 may also be configured in a manner that the lens 21 (lens unit) can be manually replaced with another lens. In this case, a user of the capture device 2 can attach one of several types of lenses to the capture device 2, such as a standard lens, a telephoto lens, and a wide-angle lens. Note that, in the case where the lens is replaced, the focal length and f-number (aperture value) will change, and an image can be captured according to the lens used in the capture device 2.

In the present embodiment, the focal length refers to a distance from the lens to a position where light converges when the light is incident parallel to the lens. The f-number is a numerical value of the amount of light captured by the capture device 2 according to the diaphragm mechanism. Note that a smaller f-number indicates a larger amount of light captured in the capture device 2 (i.e., the aperture increases in size).

Light reflected on the subject enters the lens 21. The light incident on the lens 21 transmits through the lens 21. The light transmitted through the lens 21 reaches the image sensor 22 and is received (detected) by the image sensor 22. The image sensor 22 converts the received light into an electrical signal (photoelectric conversion) to generate an image configured by a plurality of pixels.

The image sensor 22 can be realized by, for example, a change coupled device (CCD) image sensor and a complementary metal oxide semiconductor (CMOS) image sensor. The image sensor 22 includes, for example, a first sensor (R sensor) 221 that detects light in a red (R) wavelength band, a second sensor (G sensor) 222 that detects light in a green (G) wavelength band, and a third sensor (B sensor) 223 that detects light in a blue (B) wavelength band. The image sensor 22 can receive lights in the corresponding wavelength bands by the first to third sensors 221 to 223 and generate sensor images (R image, G image, and B image) corresponding to each wavelength band (color component). In other words, the image captured by the capture device 2 is a color image (RGB image), and the image includes the R image, the G image, and the B image.

Note that, in the present embodiment, the image sensor 22 is described as including the first to third sensors 221 to 223. However, the image sensor 22 need only be configured to include at least one of the first to third sensors 221 to 223. Furthermore, the image sensor 22 can also be configured to include, for example, a sensor for generating a monochrome image instead of the first to third sensors 221 to 223.

An image generated based on the light transmitted through the lens 21 in the present embodiment is an image affected by aberration of (the lens 21 included in) the optical system and includes bokeh caused by the aberration. Note that the details of the bokeh occurred in the image are described below.

The capture condition presentation device 3 includes the following functional components: storage 31, an image acquisition module 32, a configuration information acquisition module 33, a capture distance acquisition module 34, a capture condition creation module 35, and an output processing module 36.

The storage 31 stores a statistical model (distance estimation model) used to measure the distance (depth) to a subject from images captured by the capture device 2. Note that, in the present embodiment, the above-mentioned ranging device is configured to measure the distance to the subject from an image using a statistical model identical to the statistical model stored in the storage 31 (i.e., the statistical model used in the capture condition presentation device 3).

The statistical model is generated by learning bokeh that occurs in images affected by the aberration of the optical system described above and that changes nonlinearly according to the distance to the subject in the image.

Note that the statistical model can be generated by applying various known machine learning algorithms, such as a neural network or a random forest. Also, the neural network applicable in the present embodiment may include, for example, a convolutional neural network (CNN), a fully connected neural network, and a recurrent neural network.

The image acquisition module 32 acquires images captured by the capture device 2 described above from the capture device 2 (image sensor 22).

The configuration information acquisition module 33 acquires configuration information of the capture device 2 of when the image acquired by the image acquisition module 32 was captured. Note that the configuration information of the capture device 2 is assumed as being embedded in the image captured by the capture device 2 as, for example, an image metafile (EXIF information) such as an exchangeable image file format (EXIF), which is a format for a digital camera in which the date and time at which the image is captured and other setting data can be saved in the image. In this case, the configuration information acquisition module 33 can acquire the configuration information of the capture device 2 from the image (EXIF information) acquired by the image acquisition module 32.

Based on the image acquired by the image acquisition module 32, the capture distance acquisition module 34 acquires a capture distance with respect to the image. Note that, in the present embodiment, the capture distance is the distance between a subject in the image and the capture device 2 of when the image acquired by the image acquisition module 32 was captured, and corresponds to a position of the capture device 2 with reference to the subject. This capture distance is acquired by, for example, using the statistical model stored in the storage 31 and the configuration information of the capture device 2 acquired by configuration information acquisition module 33.

The capture condition creation module 35 creates capture conditions of an image suitable for measuring the distance from the capture device 2 to the subject based on the configuration information of the capture device 2 acquired by the configuration information acquisition module 33 and the capture distance acquired by the capture distance acquisition module 34.

The output processing module 36 outputs the capture conditions created by the capture condition creation module 35. In this case, the capture conditions are presented (suggested) to, for example, a user of the capture device 2 (a photographer who captures images using the capture device 2) as the capture conditions for an image to realize appropriate distance measurement to the subject.

FIG. 2 shows an example of a system configuration of the capture condition presentation device 3 shown in FIG. 1. As shown in FIG. 2, the capture condition presentation device 3 includes a CPU 301, a nonvolatile memory 302, a RAM 303, a communication device 304, an input device 305, and an output device 306, etc. The capture condition presentation device 3 also includes a bus 105 that interconnects the CPU 301, the nonvolatile memory 302, the RAM 303, the communication device 304, the input device 305, and the output device 306.

The CPU 301 is a processor for controlling the operation of various components in the capture condition presentation device 3. The CPU 301 may be a single processor or may be configured by multiple processors. Although a central processing unit (CPU) is used here as a processor that controls the operation of the components, a graphics processing unit (GPU) may also be used. The CPU 301 executes various programs that are loaded from the nonvolatile memory 302 into the RAM. These programs executed by the CPU 301 include an operating system and various application programs, including a capture condition presentation program (image processing program) 303A.

The nonvolatile memory 302 is a storage medium used as an auxiliary storage device. The RAM 303 is a storage medium used as a main storage device. In FIG. 2, only the nonvolatile memory 302 and the RAM 303 are shown. However, the capture condition presentation device 3 may also include, for example, a hard disk drive (HDD) and a solid state drive (SSD).

Note that, in the present embodiment, the storage 31 shown in FIG. 1 is realized by, for example, the nonvolatile memory 302 or other storage devices.

Furthermore, in the present embodiment, it is assumed that some or all of the image acquisition module 32, the configuration information acquisition module 33, the capture distance acquisition module 34, the capture condition creation module 35, and the output processing module 36 are realized by executing the capture condition presentation program 303A on the CPU 301 (i.e., the computer of the capture condition presentation device 3), that is, by software. This capture condition presentation program 303A may be stored on a computer-readable storage medium and distributed, or downloaded to the capture condition presentation device 3 through a network. Note that some or all of these modules 32 to 36 may be realized by hardware such as an integrated circuit (IC), or by a combination of software and hardware.

The communication device 304 is a device configured to execute wired or wireless communication. The communication device 304 executes communication, etc., with external devices via a network. This external device includes the capture device 2. In this case, the capture condition presentation device 3 receives images and configuration information of the capture device 2 from the capture device 2 via the communication device 304.

The input device 305 includes, for example, a mouse or a keyboard. The output device 306 includes, for example, a display and speakers. Note that the input device 305 and the output device 306 may be configured as a single unit, such as a touch screen display.

Here, the present embodiment assumes a configuration in which the statistical model stored in the storage 31 is used to acquire the capture distance, and the capture conditions are created based on the capture distance. The following describes an overview of the statistical model used in the present embodiment with reference to FIG. 3.

In the present embodiment, the statistical model is constructed so that the image captured by the capture device 2 (image generated by the image sensor 22) is input. Note that the image input to the statistical model is the image affected by the aberration of the optical system (lens 21) of the capture device 2 as described above.

As described above, the statistical model in the present embodiment is generated by learning bokeh that changes nonlinearly according to the distance to the subject in the image. According to the statistical model, a bokeh value (bokeh information) indicating bokeh that occurs in the image according to the distance to the subject in the image is estimated and output. As described below, there is a correlation between the distance to the subject in the image and the color, size, and shape of the bokeh that occurs in the image according to the distance. Therefore, the distance to the subject can be acquired by converting the bokeh value output from the statistical model into a distance.

In the present embodiment, the distance to the subject acquired by using the statistical model in the above manner is used as the capture distance described above.

Here, bokeh (bokeh caused by aberration of the optical system of the capture device 2) that occurs in the image captured by the capture device 2 in the present embodiment is described.

Figure 4:
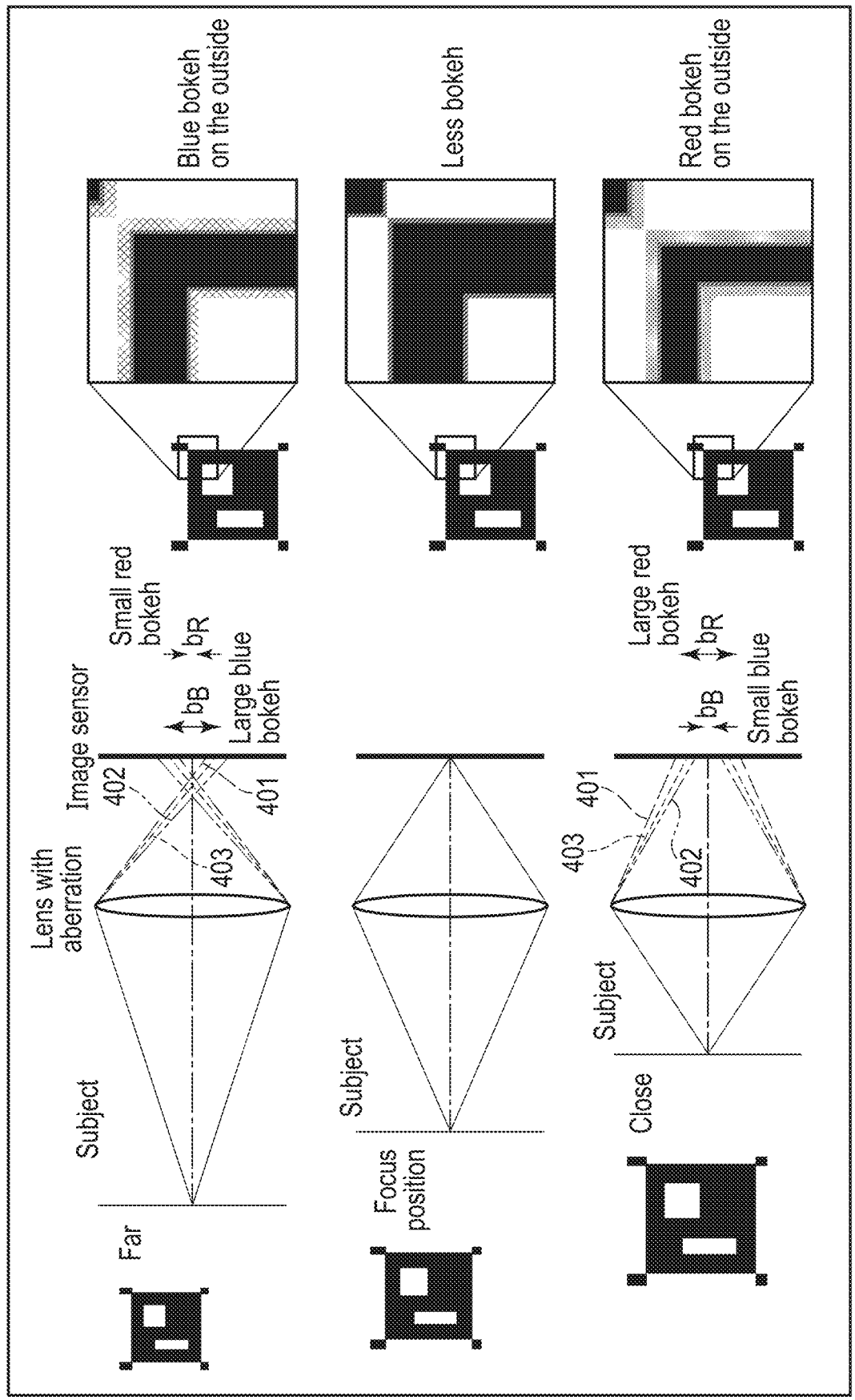
FIG. 4 shows a relationship between the distance to a subject and bokeh that occurs in an image due to chromatic aberration in the case of using a single lens.

First, among the bokeh caused by aberration of the optical system of the capture device 2, bokeh caused by chromatic aberration will be described. FIG. 4 shows a relationship between the distance to the subject and the bokeh caused in the image by chromatic aberration. In the following description, the position at which the image captured by the capture device 2 is in focus is referred to as the focus position.

A refractive index of light when transmitted through the lens 21 with aberration differs for each wavelength band. Therefore, for example, in a case where the position of a subject is out of focus, light in each wavelength band will not be concentrated at a single point but will reach different points. This is what appears as chromatic aberration (bokeh) in an image.

The upper row of FIG. 4 shows a case in which the position of the subject with respect to the capture device (image sensor 22) is farther than the focus position (i.e., the position of the subject is beyond the focus position).

In this case, for a light 401 in the red wavelength band, the image sensor 22 (first sensor 221) generates an image including a relatively small bokeh $b_R$. On the other hand, for a light 402 in the blue wavelength band, the image sensor 22 (third sensor 223) generates an image including a relatively large bokeh $b_B$. Note that, for a light 403 in the green wavelength band, an image including bokeh having an intermediate size between the bokeh $b_R$ and the bokeh $b_B$ is generated. Therefore, in such an image captured in a state where the position of the subject is farther than the focus position, blue bokeh is confirmed on the outside of the subject in the image.

On the other hand, the lower row of FIG. 4 shows a case in which the position of the subject with respect to the capture device 2 (image sensor 22) is closer than the focus position (i.e., the position of the subject is in front of the focus position).

In this case, for the light 401 in the red wavelength band, the image sensor 22 (first sensor 221) generates an image including a relatively large bokeh $b_R$. On the other hand, for the light 402 in the blue wavelength band, the image sensor 22 (third sensor 223) generates an image including a relatively small bokeh $b_B$. Note that, for the light 403 in the green wavelength band, an image including bokeh having an intermediate size between the bokeh $b_R$ and the bokeh $b_B$ is generated. Therefore, in such an image captured in a state where the position of the subject is closer than the focus position, red bokeh is observed on the outside of the subject in the image.

Here, FIG. 4 shows an example in which the lens 21 is a simple single lens. However, generally, in some cases, for example, a lens with chromatic aberration correction (hereinafter referred to as a color canceling lens) may be used in the capture device 2. Note that a color canceling lens is a lens that combines a low-dispersion convex lens and a high-dispersion concave lens, and has the fewest number of lenses as a lens for correcting chromatic aberration.

Figure 5:
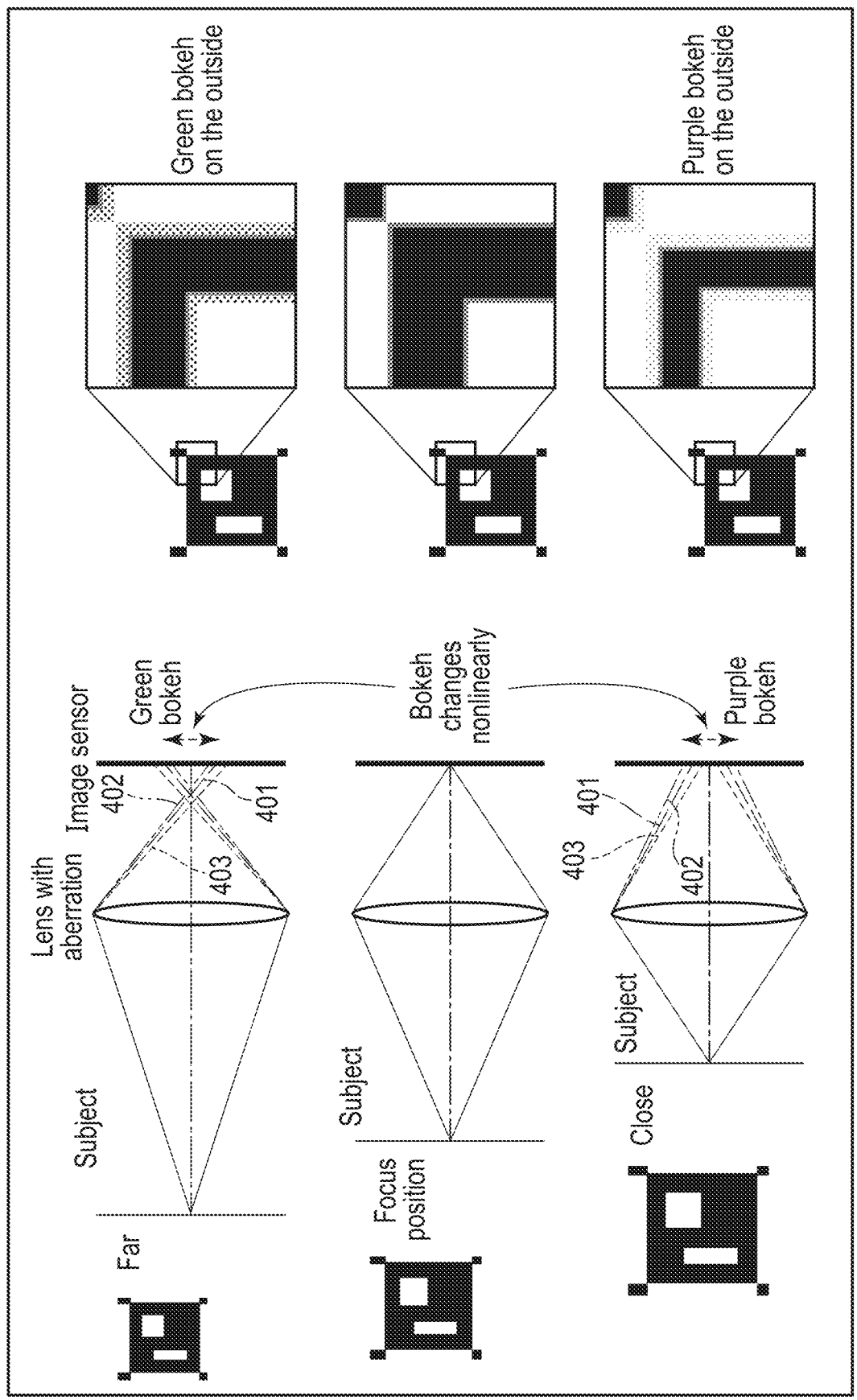
FIG. 5 shows a relationship between the distance to a subject and bokeh that occurs in an image due to chromatic aberration in the case of using a color canceling lens.

FIG. 5 shows a relationship between the distance to the subject and the bokeh occurred in the image due to chromatic aberration in the case of using the above-mentioned color canceling lens as the lens 21. Although the focus positions of the blue and red wavelengths are designed to be aligned in the color cancelling lens, chromatic aberration cannot be completely eliminated. Therefore, in a case where the position of the subject is farther than the focus position, green bokeh occurs as shown in the upper row of FIG. 5, and, in a case where the position of the subject is closer than the focus position, purple bokeh occurs as shown in the lower row of FIG. 5.

The middle rows of FIG. 4 and FIG. 5 show a case where the position of the subject with respect to the capture device 2 (image sensor 22) coincides with the focus position. In this case, the image sensor 22 (first to third sensors 221 to 223) generates an image with less bokeh.

Here, the optical system (lens unit) of the capture device 2 includes the diaphragm mechanism as described above. However, the shape of the bokeh occurred in the image captured by the capture device 2 depends on the size of the aperture of the diaphragm mechanism. Note that the shape of the bokeh is referred to as a point spread function (PSF) shape, which indicates a diffusion distribution of light generated when a point light source is captured.

The upper row of FIG. 6 shows the PSF shape generated in the center of the image captured by the capture device 2 in a case where the focus position is 1500 mm and the f-number (aperture) is F1.8 in (the optical system of) the capture device 2 that uses a lens with a focal length of 50 mm, where the PSF shape is shown from the left in an order in which the position of the subject is closer to the capture device 2. The lower row of FIG. 6 shows the PSF shape generated in the center of the image captured by the capture device 2 in a case where the focus position is 1500 mm and the f-number (aperture) is F4 in (the optical system of) the capture device 2 that uses a lens with a focal length of 50 mm, where the PSF shape is shown from the left in an order in which the position of the subject is closer to the capture device 2. Note that the center of the upper and lower rows of FIG. 6 shows the PSF shape in a case where the position of the subject coincides with the focus position.

The PSF shapes shown in corresponding positions in the upper and lower rows of FIG. 6 are the PSF shapes in the case where the positions of the subject with respect to the capture device 2 are the same. However, even in the case where the positions of the subject are the same, the PSF shape in the upper row (PSF shape in an image captured at the f-number of F1.8) is different from that in the lower row (PSF shape in an image captured at the f-number of F4).

Furthermore, as shown in the leftmost PSF shape and the rightmost PSF shape in FIG. 6, for example, even in the case where the distance from the position of the subject to the focus position is about the same, the PSF shapes differ between the case where the position of the subject is closer than the focus position and the case where the position of the subject is farther than the focus position.

Figure 7:
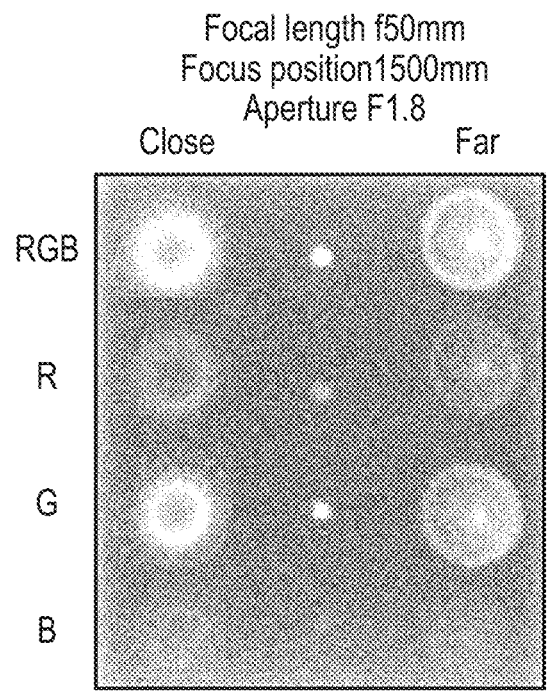
FIG. 7 shows an example of the PSF shape generated in an image of each channel.
Figure 8:
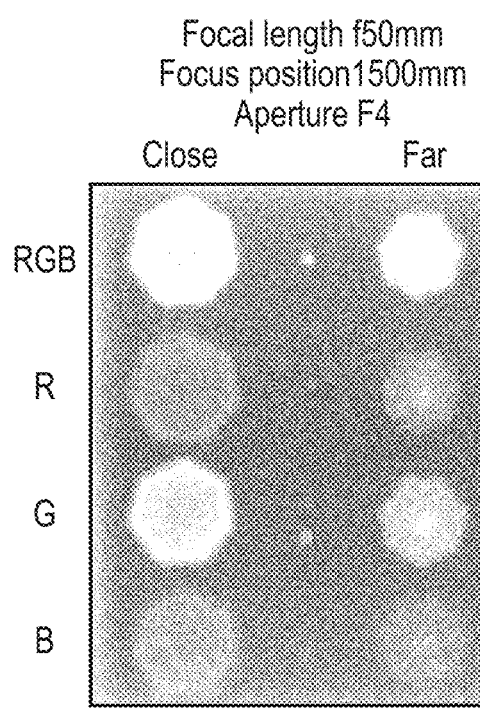
FIG. 8 shows another example of the PSF shape generated in the image of each channel.

Note that the above phenomenon in which the PSF shapes differ according to the size of the aperture of the diaphragm mechanism and the position of the subject with respect to the capture device 2 also occurs in the same manner for each channel (RGB image, R image, G image, and B image). FIG. 7 shows the PSF shape generated in the image of each channel captured by the capture device 2 in a case where the focus position is 1500 mm and the f-number is F1.8 in the capture device 2 that uses a lens with a focal length of 50 mm, where the PSF shape is shown separately for the case where the subject position is closer than (in front of) the focus position and the case where the subject position is farther than (beyond) the focus position. FIG. 8 shows the PSF shape generated in the image of each channel captured by the capture device 2 in a case where the focus position is 1500 mm and the f-number is F4 in the capture device 2 that uses a lens with a focal length of 50 mm, where the PSF shape is shown separately for the case where the subject position is closer than the focus position and the case where the subject position is farther than the focus position.

Furthermore, the PSF shape generated in the image captured by the capture device 2 varies depending on the position in the image.

Figure 9:
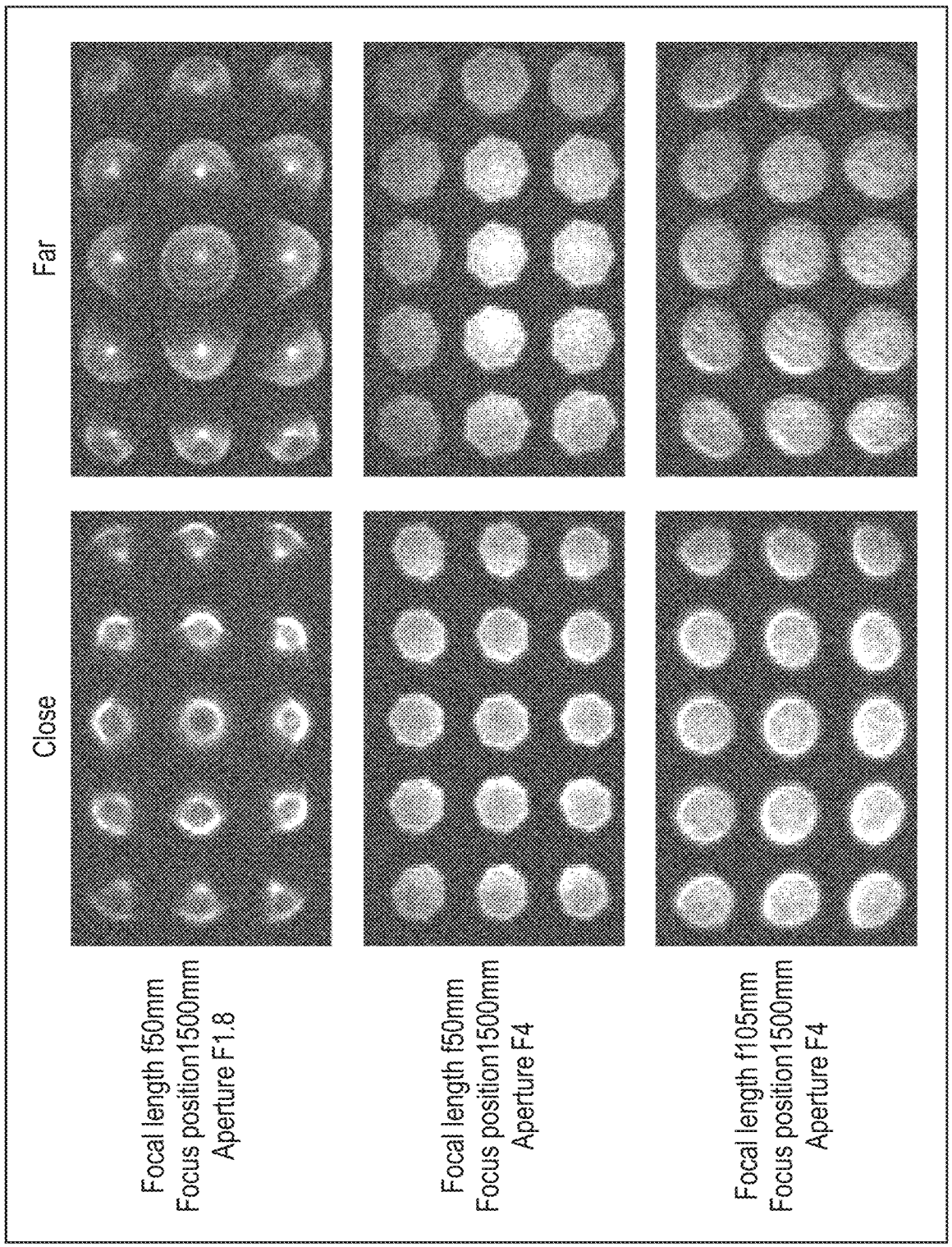
FIG. 9 shows an example of the PSF shape generated at each position in the image.

The upper row of FIG. 9 shows the PSF shape generated at each position in the image captured by the capture device 2 in the case where the focus position is 1500 mm and the f-number is F1.8 in the capture device 2 that uses a lens with the focal length of 50 mm, where the PSF shape is shown separately for the case where the subject position is closer than the focus position and the case where the subject position is farther than the focus position.

The middle row of FIG. 9 shows the PSF shape generated at each position in the image captured by the capture device 2 in the case where the focus position is 1500 mm and the f-number is F4 in the capture device 2 that uses a lens with the focal length of 50 mm, where the PSF shape is shown separately for the case where the subject position is closer than the focus position and the case where the subject position is farther than the focus position.

As shown in the upper and middle rows of FIG. 9, near the edges of the image captured by the capture device 2 (especially near the corners on the upper left, etc.), for example, a PSF shape that is different from that positioned near the center of the image can be observed.

Furthermore, the lower row of FIG. 9 shows the PSF shape generated at each position in the image captured by the capture device 2 in the case where the focus position is 1500 mm and the f-number is F4 in the capture device 2 that uses a lens with the focal length of 105 mm, where the PSF shape is shown separately for the case where the subject position is closer than the focus position and the case where the subject position is farther than the focus position.

The upper and middle rows of FIG. 9 above show the PSF shapes generated in images captured using the same lens. However, as shown in the lower row of FIG. 9, in a case where a lens with a different focal length is used, a different PSF shape (PSF shapes different from those in the upper and middle rows of FIG. 9) is observed in accordance with the lens concerned.

Next, with reference to FIG. 10, positional dependency of the PSF shape (lens aberration) according to the type of lens used in the optical system of the capture device 2 described above is described in detail. FIG. 10 shows the PSF shapes generated near the center (center of the screen) and near the edges (edges of the screen) of an image captured using multiple lenses of different focal lengths, where the PSF shape is shown separately for the case where the subject position is closer than the focus position and the case where the subject position is farther than the focus position.

As shown in FIG. 10, the PSF shapes generated near the center of the image are generally circular and identical even in the case where the lens types are different. However, the PSF shapes generated near the edge of the image are different from the PSF shapes generated near the center of the image, and each have characteristics (features) according to the lens types. Note that, the following points are in common even in the case where the types of lenses differ: purple bokeh occurs near the edge of the PSF shape in the case where the subject position is closer than the focus position; and green bokeh occurs near the edge of the PSF shape in the case where the subject position is farther than the focus position as explained in FIG. 5 above.

In FIG. 10, two examples (#1 and #2) are shown for a lens with a focal length of 50 mm. This indicates that the focal length of 50 mm is the same, but the manufacturer of the lens is different (i.e., they are different products). The same applies to the lens with the focal length of 85 mm.

As described above, the bokeh that changes nonlinearly according to the distance to the subject in the present embodiment includes the bokeh caused by the chromatic aberration of the optical system of the capture device 2 described in FIG. 4 and FIG. 5 above, the bokeh caused by the size of the aperture (i.e., f-number) of the diaphragm mechanism that adjusts the amount of light taken into the optical system of the capture device 2 described in FIG. 6 to FIG. 8, and the bokeh that varies according to the position in the image captured by the capture device 2 described in FIG. 9 and FIG. 10.

Figure 11:
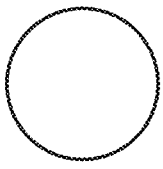
FIG. 11 shows a relationship between nonlinearity of the PSF shape and the shape of the aperture of the diaphragm mechanism.

Note that the PSF shape also depends on the shape of the aperture of the diaphragm mechanism. Here, FIG. 11 shows the relationship between the nonlinearity (asymmetry) of the PSF shape and the shape of the aperture of the diaphragm mechanism. The nonlinearity of the PSF shape described above tends to occur in a case where the shape of the aperture of the diaphragm mechanism is other than a circle. In particular, the nonlinearity of the PSF shape is more likely to occur in a case where the shape of the aperture is an odd-numbered square or is an even-numbered square arranged asymmetrically with respect to a horizontal or vertical axis of the image sensor 22.

In the present embodiment, the bokeh value indicating the bokeh occurred in the image is estimated (predicted) using a statistical model generated by focusing on the point where the bokeh (color, size, and shape) occurred in the image described above is a physical clue relating to the distance to the subject. Note that the bokeh value estimated by the statistical model in the present embodiment (i.e., output from the statistical model) is a scalar quantity that represents the amount of bokeh including the color, size, and shape of the bokeh that occurs in the image.

The following is an example of a method for estimating (a bokeh value indicating) bokeh from an image by means of a statistical model in the present embodiment. Here, first to third methods are described.

Figure 12:
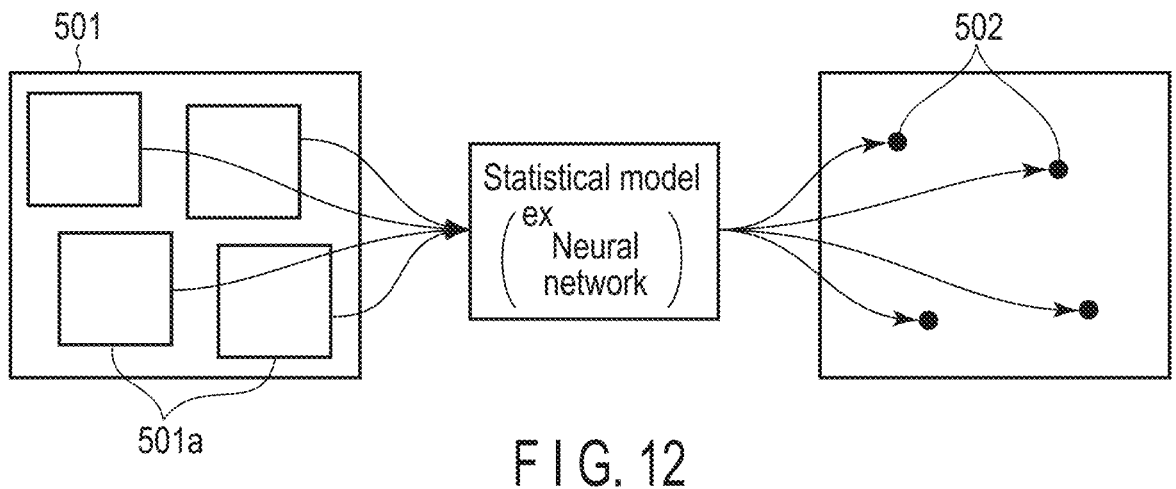
FIG. 12 illustrates a first method for estimating bokeh from an image.

First, the first method is explained with reference to FIG. 12. In the first method, a local area (image patch) 501a is extracted from an image 501. In this case, for example, the entire area of the image 501 may be divided into a matrix, and partial areas after the division may be extracted sequentially as the local area 501a, or the image 501 may be recognized, and the local area 501a may be extracted to cover the area where the subject (image) is detected.

Furthermore, the local area 501a may partially overlap with other local areas 501a.

Next, for each extracted local area 501a, information relating to the local area 501a (information relating to the image 501) is input to the statistical model to estimate a bokeh value that indicates bokeh that occurs according to the distance to the subject in the local area 501a.

The statistical model to which the information relating to the local area 501a is inputted in this manner estimates a bokeh value 502 for each pixel configuring the local area 501a.

Here, for example, in a case where a particular pixel belongs to both a first local area 501a and a second local area 501a (i.e., areas including the pixel overlap between the first local area 501a and the second local area 501a), the bokeh value estimating that the pixel belongs to the first local area 501a may differ from the bokeh value estimating that the pixel belongs to the second local area 501a.

Thus, for example, in a case where a plurality of partially overlapping local areas 501a are extracted as described above, the bokeh value of the pixels configuring the area where the plurality of local areas 501a overlap may be, for example, an average value of the bokeh value estimated for a part of the area (pixel) in one local area 501a overlapping the other local area 501a and the bokeh value estimated for a part of the area (pixel) in the other local area 501a. Furthermore, the bokeh value may be determined by a majority decision of the bokeh values estimated for a part of each area of the partially overlapping three or more local areas 501a.

Figure 13:
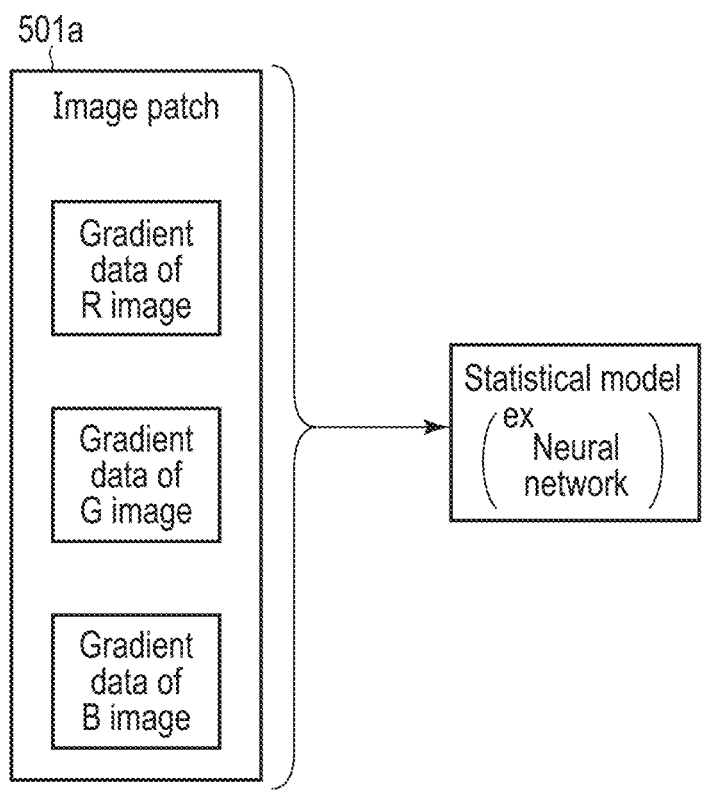
FIG. 13 shows an example of information input to a statistical model in the first method.

FIG. 13 shows an example of the information relating to the local area 501a that is input to the statistical model in the first method described above.

As shown in FIG. 13, gradient data of the local area 501a extracted from the image 501 is input to the statistical model. The gradient data of the local area 501a is generated from each of the R image, G image, and B image included in the image 501, and includes the gradient data of the R image, the gradient data of the G image, and the gradient data of the B image.

Note that the gradient data indicates a difference in pixel values (difference value) between each pixel and a pixel adjacent to the pixel. For example, in a case where the local area 501a is extracted as a rectangular area of n pixels (in an X-axis direction)×m pixels (in a Y-axis direction), gradient data is generated, in which, for example, the difference value for each pixel in the local area 501a calculated with respect to, for example, an adjacent pixel on the right is arranged in an n-row×m-row matrix.

The statistical model uses the gradient data of the R image, the gradient data of the G image, and the gradient data of the B image to estimate the bokeh value indicating the bokeh occurred in each of the images. FIG. 13 shows a case where the gradient data of each of the R image, the G image, and the B image is input to the statistical model. The gradient data of the image 501 (RGB image) may also be input to the statistical model.

Next, the second method is explained with reference to FIG. 14. In the second method, as information relating to the local area 501a in the first method, the gradient data for each local area (image patch) 501a and the position information of the local area 501a in the image 501 are input to the statistical model.

Position information 501b may, for example, indicate a center point or a predetermined side, such as the upper left side, of the local area 501a. In addition, a position of each of the pixels configuring the local area 501a on the image 501 may also be used as the position information 501b.

By further inputting the position information 501b to the statistical model as described above, a bokeh value 502 can be estimated by considering the difference between, for example, bokeh of a subject image formed by light transmitted through the center of the lens 21 and bokeh of a subject image formed by light transmitted through the edge of the lens 21.

In other words, according to this second method, the bokeh value can be estimated from the image 501 based on the correlation with the position on the image.

FIG. 15 shows an example of information relating to the local area 501a input to the statistical model in the second method described above.

For example, in a case where a rectangular area of n pixels (in the x-axis direction)×m pixels (in the y-axis direction) is extracted as the local area 501a, an X-coordinate value (X-coordinate data) and a Y-coordinate value (Y-coordinate data) on the image 501 corresponding to, for example, the center point of the local area 501a are obtained.

In the second method, the X-coordinate data and the Y-coordinate data acquired in this manner are input to the statistical model together with the gradient data of the R image, the G image, and the B image described above.

Figure 16:
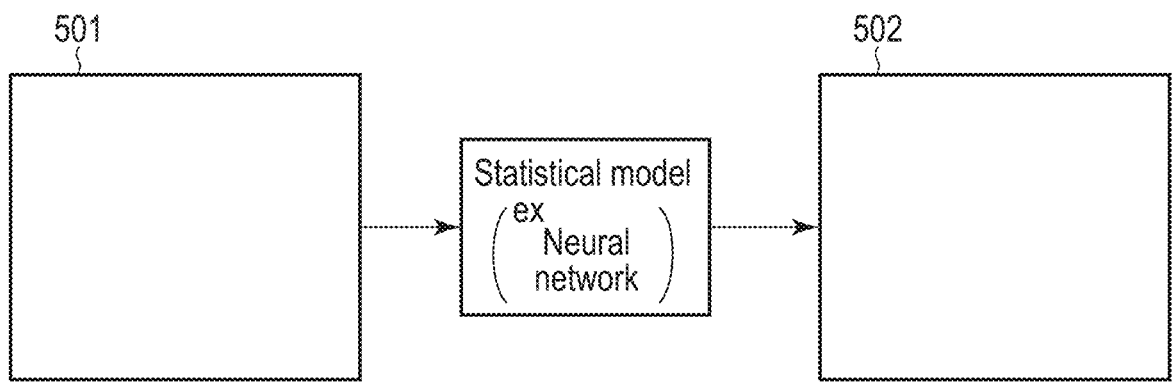
FIG. 16 illustrates a third method for estimating bokeh from an image.

The third method is further explained with reference to FIG. 16. In the third method, the local area 501a is not extracted from image 501 as in the first and second methods described above. In the third method, for example, information relating to all areas of the image 501 (gradient data of the R image, the G image, and the B image) is input to the statistical model.

Compared to the first and second methods, which estimate the bokeh value 502 for each local area 501a, the third method may increase the uncertainty of the estimation by the statistical model, but can reduce the processing load for the estimation.

In the following explanation, the information input to the statistical model in the first to third methods above will be referred to as image-related information for convenience.

Here, the bokeh value is described as being estimated for each pixel; however, the bokeh value may be estimated for each predetermined area including at least one pixel.

The correlation between the bokeh occurred in the image and the distance to the subject in the image in the present embodiment is explained in detail below with reference to FIG. 17.

Figure 17:
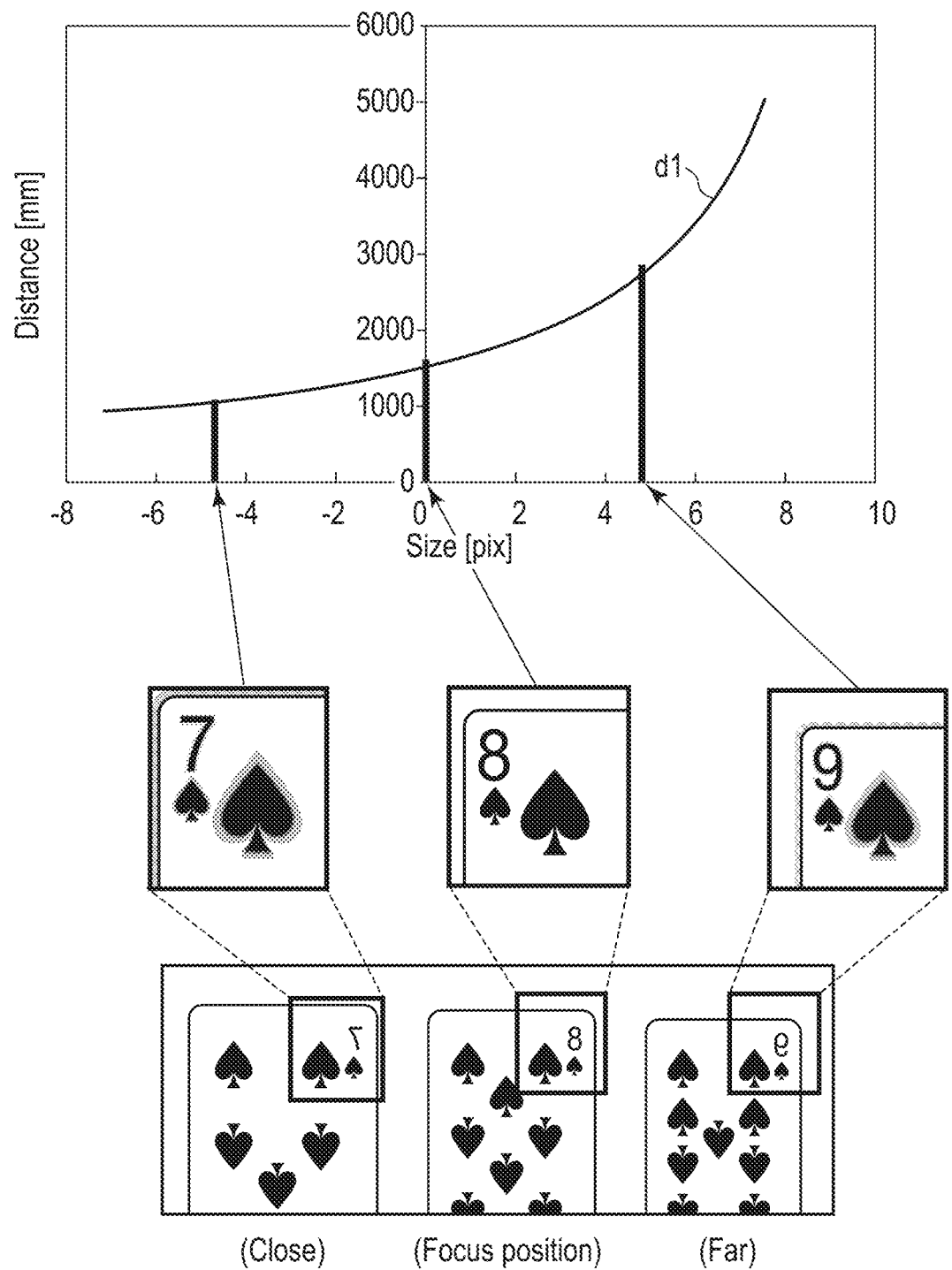
FIG. 17 specifically illustrates a correlation between bokeh generated in an image and the distance to a subject in the image.

In FIG. 17, the size of the bokeh that occurs in a case where the subject is closer than (in front of) the focus position is shown as a negative value on the X-axis, and the size of the bokeh that occurs in a case where the subject is farther than (beyond) the focus position is shown as a positive value on the X-axis. In other words, as mentioned above, the color observed in the bokeh of a subject differs between a case where the position of the subject is closer than the focus position and the case where the position of the subject is farther than the focus position. Therefore, in FIG. 17, it may be considered that the color and size of the bokeh are indicated by positive and negative values.

FIG. 17 also shows that, in both cases where the subject is closer than the focus position and where the subject is farther than the focus position, the farther the subject is from the focus position, the larger the absolute value of the bokeh size (pixel) becomes.

The example shown in FIG. 17 assumes that the focus position in the optical system of the capture device 2 that captured the image is approximately 1500 mm. In this case, for example, bokeh of approximately −4.8 pixels corresponds to a distance of approximately 1000 mm from the optical system, bokeh of 0 pixels corresponds to a distance of 1500 mm from the optical system, and bokeh of approximately 4.8 pixels corresponds to a distance of approximately 750 mm from the optical system.

Here, for convenience, the case where the color and size (pixels) of the bokeh are shown on the x-axis is described. However, as explained in FIG. 6 to FIG. 10 above, the shape of the bokeh occurred in the image (PSF shape) also differs depending on a case where the subject is closer than the focus position and a case where the subject to farther than the focus position, and the position in the image. Therefore, the value shown on the X-axis in FIG. 17 (i.e., the bokeh value) is actually the value that reflects the shape of the bokeh (PSF shape).

Since there is a correlation between the distance to the subject and the color, size, and shape of the bokeh as indicated by, for example, a line d1 in FIG. 17, estimating the distance is synonymous with estimating (the bokeh value indicating) the color, size, and shape of the bokeh.

Note that, for example, a configuration in which the statistical model directly estimates the distance may also be considered. However, a configuration in which the statistical model estimates the bokeh value is more versatile because the same statistical model can be used even in a case where the focus position (focal length) in the optical system has been changed.

In the present embodiment, the statistical model described above can be used to obtain (estimate) from an image a bokeh value indicating the bokeh that occurs in the image according to the distance to the subject in the image. The statistical model is generated by executing a process (hereinafter referred to as a learning process) to learn bokeh (bokeh that changes nonlinearly according to the distance to the subject in the image) that occurs in an image affected by the aberration of the optical system of the capture device 2 as described above.

The following is an overview of the learning process executed to generate the statistical model (hereinafter referred to as a statistical model learning process).

Figure 18:
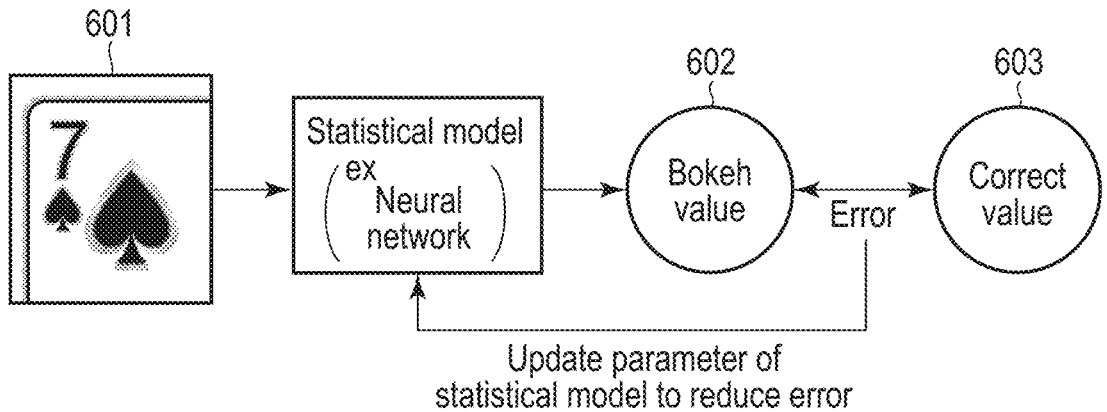
FIG. 18 shows an example of a statistical model learning process.

FIG. 18 shows an example of the statistical model learning process (learning method) in the present embodiment. The statistical model learning process is executed using images prepared for causing the statistical model to learn (hereinafter referred to as images for learning). The images for learning can be, for example, images captured by the capture device 2, or may be images captured by other capture devices (camera, etc.) having an optical system that is similar to the optical system of the capture device 2.

In the case of using any one of the first method described with reference to FIG. 12, the second method described with reference to FIG. 14, and the third method described with reference to FIG. 16 above, the statistical model learning process is basically performed by inputting (information relating to) an image for learning 601 to the statistical model, then feeding back an error between a bokeh value 602 estimated by the statistical model and a correct value 603 to the statistical model. Note that feedback corresponds to updating parameters (e.g., weight coefficients) of the statistical model so that the error decreases.

In a case where the first method is applied as the method for estimating the bokeh value from the image as described above, even during the statistical model learning process, the information (gradient data) on the local area is input to the statistical model for each local area (image patch) extracted from the image for learning 601, and the bokeh value 602 of each pixel in each local area is estimated by the statistical model. An error obtained by comparing the bokeh value 602 estimated in this manner and the correct value 603 is fed back to the statistical model.

Similarly, in a case where the second method is applied as the method for estimating the bokeh value from the image, even during the statistical model learning process, the gradient data and the position information are input to the statistical model as information relating to the local area for each local area (image patch) extracted from the image for learning 601, and the bokeh value 602 of each pixel in each local area is estimated by the statistical model. An error obtained by comparing the bokeh value 602 estimated in this manner and the correct value 603 is fed back to the statistical model.

Furthermore, in a case where the third method is applied as the method for estimating the distance from the image, information (gradient data) on all areas of the image for learning 601 is input to the statistical model at once also during the statistical model learning process, and the bokeh value 602 of each pixel in the image for learning 601 is estimated by the statistical model. An error obtained by comparing the bokeh value 602 estimated in this manner and the correct value 603 is fed back to the statistical model.

According to the above statistical model learning process, the parameters of the statistical model are updated so that the error between the bokeh value 602 and the correct value 603 decreases. In this manner, the statistical model can learn the bokeh that occurs in the image for learning 601.

Note that the statistical model in the present embodiment is generated, for example, by repeatedly executing a learning process using images captured while changing the distance from the capture device 2 to the subject in a state where the focus position is fixed. Furthermore, in a case where the learning process for one focus position is completed, by executing the learning process for other focus positions in the same manner, a statistical model with higher accuracy can be generated.

Furthermore, the correct values used in the statistical model learning process in the present embodiment are the bokeh values (i.e., bokeh values indicating the color, size and shape of the bokeh corresponding to the actual distance) converted from the actual distance to the subject when the image for learning is captured as described above.

Figure 19:
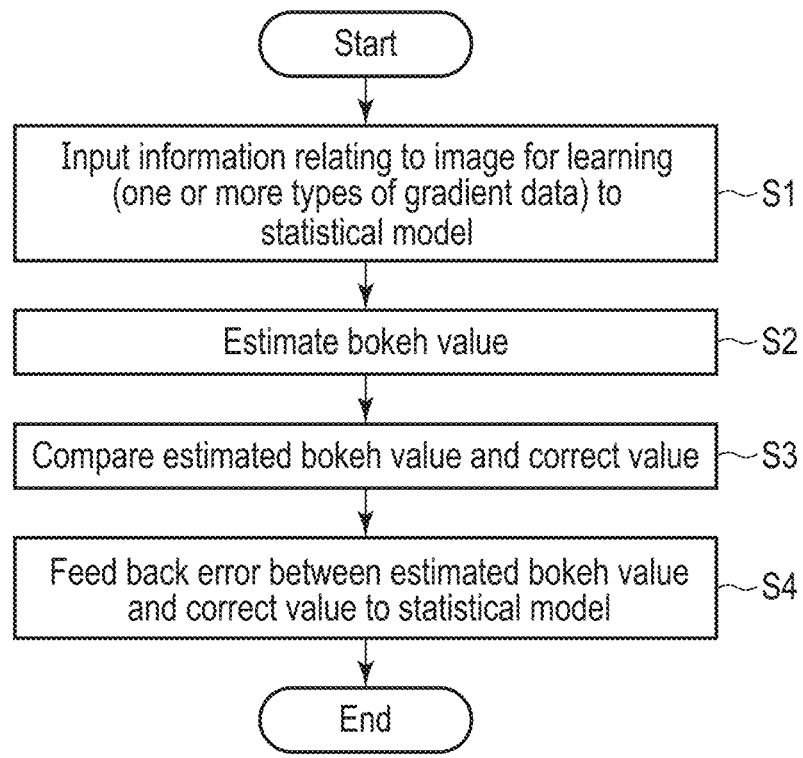
FIG. 19 is a flowchart showing an example of a processing procedure of the statistical model learning process.

Next, with reference to the flowchart in FIG. 19, an example of a processing procedure of the statistical model learning process is described. Note that, the processing shown in FIG. 19 may be executed by, for example, the capture condition presentation device 3, or by other devices, etc.

First, (information relating to) an image for learning prepared in advance is input to the statistical model (step S1). This image for learning is, for example, an image generated by the image sensor 22 based on light transmitted through the lens 21 provided in the capture device 2, and is an image affected by the aberration of the optical system (lens 21) of the capture device 2. Specifically, the image for learning has bokeh that changes nonlinearly according to the distance to the subject described in FIG. 4 to FIG. 10.

Note that, in the statistical model learning process, it is assumed that images for learning are prepared in advance, in which the subject is captured at each distance with a very fine granularity from the lower limit (front) to the upper limit (back) of the distance that can be measured (estimated) by using the statistical model. Furthermore, it is also desirable to have a variety of images of different subjects as images for learning.

In a case where the first method described above is applied as a method for estimating bokeh values from images, gradient data of the R image, G image, and B image for each local area of the image for learning is input to the statistical model as information relating to the image for learning.

In a case where the second method described above is applied as a method for estimating bokeh values from images, gradient data of the R image, the G image, and the B image and position information of the local area on the image for learning are input to the statistical model as information relating to the image for learning.

In a case where the third method described above is applied as a method for estimating bokeh values from images, gradient data of the R image, the G image, and the B image of all areas of the image for learning is input to the statistical model as information relating to the image for learning.

Note that, in the present embodiment, the gradient data of the R image, the G image, and the B image is explained as being input to the statistical model. However, in a case where the statistical model estimates the bokeh value in terms of the bokeh shape (PSF shape) occurred in the image, a gradient data of at least one of the gradient data of the R image, the G image, and the B images should be input to the statistical model. On the other hand, in a case where the statistical model estimates the bokeh value in terms of the color and size of the bokeh that occurs in the image by chromatic aberration, at least two of the gradient data of the R image, the G image, and the B image should be input to the statistical model.

After the processing in step Si is executed, the bokeh value is estimated by the statistical model (step S2).

The bokeh value estimated in step S2 is compared with a correct value obtained when the image for learning was captured (step S3).

The comparison result (error) in step S3 is fed back to the statistical model (step S4). In the statistical model, parameters are then updated to reduce the error (i.e., the bokeh that occurs in the image for learning in accordance with the distance to the subject is learned).

By repeating the above processing shown in FIG. 19 for each image for learning, a statistical model with high estimation accuracy is generated. The statistical model generated in this manner is stored in the storage 31 included in the capture condition presentation device 3.

Note that, in the present embodiment, the above statistical model is also held in the ranging device. The ranging device measures a distance to the subject in the image (i.e., measures the distance) by converting the bokeh value output from the statistical model into the distance. The bokeh value is obtained by inputting the image captured by the capture device 2 to the statistical model.

That is, in consideration of the matter that the ranging device measures the distance to the subject from the image by using the statistical model in the manner above, the capture condition presentation device 3 according to the present embodiment uses (the same statistical model as) the statistical model to acquire the capture distance, and, based on the acquired capture distance, creates and outputs capture conditions (conditions for capturing an image suitable for measuring the distance to the subject). In this manner, the accuracy of the distance to the subject measured by the ranging device can be improved.

Hereinafter, with reference to the flowchart in FIG. 20, an example of a processing procedure of the capture condition presentation device 3 according to the present embodiment is descried.

First, the image acquisition module 32 acquires an image (hereinafter referred to as a captured image) including a subject captured by the capture device 2 (image sensor 22) (step S11). This captured image is an image affected by aberration of the optical system (lens 21) of the capture device 2, as described above. The captured image acquired in step S11 is passed to the capture distance acquisition module 34.

Note that the captured image (image data) passed from the image acquisition module 32 to the capture distance acquisition module 34 may be, for example, RAW data, or may be data obtained after executing predetermined image processing (data processing), such as development processing to convert the RAW data into a predetermined format or processing to change the resolution. Note that the image processing executed with respect to the captured image includes, for example, pre-processing for inputting the captured image to a statistical model and processing for reducing a processing time (processing volume) in the capture condition presentation device 3.

Next, the configuration information acquisition module 33 acquires configuration information of the capture device 2 of when the captured image was captured from, for example, (EXIF information of) the captured image (step S12). In the present embodiment, the configuration information of the capture device 2 is information relating to the optical system of the capture device 2, including, for example, a focus distance. In the present embodiment, the focus distance is a distance to a focus position in the captured image (focus position in the captured image) described above, and is determined by the optical system of the capture device 2 (distance between the lens 21 and the image sensor 22). Furthermore, the configuration information of the capture device 2 further includes the focal length, the f-number, position of the lens 21, and size of the image sensor 22 (size of one pixel in the image sensor 22), etc. The configuration information of the capture device 2 acquired in step S12 is passed to the capture distance acquisition module 34 and the capture condition creation module 35.

The capture distance acquisition module 34 acquires the capture distance (i.e., the current capture distance) with respect to the captured image (step S13). This processing of step S13 includes a distance estimation process using the statistical model stored in the storage 31.

The processing in step S13 is explained below. First, the capture distance acquisition module 34 inputs the captured image passed from the image acquisition module 32 to the statistical model to acquire a bokeh value output from the statistical model (i.e., the bokeh value estimated in the statistical model). Note that the process of acquiring the bokeh value corresponds to the processing of steps S1 and S2 shown in FIG. 19 above. Therefore, the detailed explanation is omitted here.

Next, the capture distance acquisition module 34 converts the acquired bokeh value into a distance. Note that the configuration information of the capture device 2 passed from the configuration information acquisition module 33 is used for converting the bokeh value into the distance. Specifically, a distance u is expressed by the following expression (1) using a bokeh value b.

$$u = \frac{f^2 u_f}{f^2 - 2Fu_f b} \quad \text{(Expression 1)}$$

In expression (1), "f" represents the focal length in the optical system of the capture device 2 that captured the captured image. "$u_f$" represents the distance to a position that is in focus in the captured image (i.e., focus distance). "F" represents the f-number (aperture value) of the optical system of the capture device 2 that captured the captured image.

That is, in the present embodiment, the distance can be calculated by applying the bokeh value acquired using the statistical model as described above, the focus distance, the focal length, and the f-number included in the configuration information of the capture device 2 to expression (1).

In step S13, the distance calculated as described above (i.e., the distance converted from the bokeh value) is acquired as the capture distance.

Here, in a case where the captured image is input to the statistical model, the statistical model outputs a bokeh value for each pixel configuring the captured image. Therefore, the capture distance acquisition module 34 converts each of the bokeh values output for each pixel into a distance (i.e., calculates the distance for each pixel). In this case, the capture distance acquisition module 34 acquires (determines) the capture distance based on the distance calculated for each pixel.

Specifically, the capture distance acquisition module 34 calculates a statistical value (statistic) such as the average value or the median value of the distance calculated for each pixel, and acquires the statistical value as the capture distance.

Here, the statistical value of the distance calculated for each pixel is described as being acquired as the capture distance; however, the distance calculated for a specific pixel (e.g., a pixel located in the center of the captured image or a pixel specified by a user) among multiple pixels configuring the captured image may also be acquired as the capture distance.

Furthermore, the capture distance may be acquired based on, for example, the distance calculated for each pixel configuring an area of interest in the captured image. Specifically, for example, an area including the subject in the captured image may be extracted as the area of interest, and the statistical value of the distance calculated for each pixel configuring the area of interest can be acquired as the capture distance.

In this case, the area of interest may be, for example, a rectangular-shaped area, or may also be an area shaped along the contour of the subject (i.e., a mask-like area that corresponds to the shape of the subject).

Note that the area of interest is to be automatically extracted by executing the image processing with respect to the captured image; however, may also be extracted by using, for example, a machine-learned model that is prepared in advance. The machine-learned model used to extract such an area of interest may be, for example, a machine learning model that has learned to extract (present) an area (rectangular area, etc.) that includes a subject (object) by detecting the subject in an image, or a machine learning model that has learned to extract an area configured by pixels classified to (a category corresponding to) the same subject by classifying each of multiple pixels that configure an image in pixel units. However, other machine learning models may also be used. The area of interest may also be specified manually by the user.

Furthermore, in the present embodiment, the statistical model is described as estimating the bokeh value for each pixel configuring the image. However, the statistical model may also be constructed in such a way that the bokeh value is estimated and an uncertainty level indicating the level of uncertainty of the bokeh value is calculated (i.e., in a case where the image is input, the blue value and the uncertainty level are output). In the case of using such a statistical model, the uncertainty level with respect to the distance converted from the bokeh value estimated in the statistical model (distance calculated for each pixel) can be obtained. Therefore, the capture distance may also be acquired by using the uncertainty level. Specifically, for example, the distance for which the uncertainty level is equal to or greater than a predetermined value (threshold) can be excluded from the target for calculating the statistics to be acquired as the capture distance, and the statistics of the distance for which the uncertainty level is smaller than the threshold can be acquired as the capture distance.

Note that, although multiple methods of acquiring the capture distance are described here, the method of acquiring the capture distance employed in the present embodiment may, for example, be set in advance by the user or may be changed dynamically according to the image.

When the processing in step S13 is executed, the capture distance acquired in step S13 is passed to the capture condition creation module 35.

Next, the capture condition creation module 35 creates the capture conditions based on the configuration information of the capture device 2 passed from the configuration information acquisition module 33 and the capture distance passed from the capture distance acquisition module 34 (step S14). Note that the capture conditions created in step S14 are capture conditions of an image for improving the accuracy of distance measurement using the statistical model described above.

Here, in general, the accuracy of image processing depends on the sharpness of the image. In a case where the image contains a large size bokeh, the accuracy of the image processing is considered to decrease. According to this, in a configuration that measures the distance to a subject in an image using the statistical model described above (i.e., by inputting an image to the statistical model, converting the bokeh value output from the statistical model into a distance), for example, in a case where the subject to be measured is located near the focus position, the measurement accuracy of the distance to the subject becomes high. On the other hand, in a case where the bokeh is large, it becomes difficult to capture the characteristics of the bokeh. Therefore, the farther the subject is from the focus position (i.e., the larger the bokeh), the less accurate the distance measurement to the subject becomes.

Therefore, in step S14, based on this point of view, for example, the capture conditions are created to suggest changing the distance between the subject and the capture device 2 so that the distance between the subject and the capture device 2 approaches the focus distance (i.e., the position of the subject becomes close to the focus position).

Specifically, in step S14, capture conditions that include, for example, the focus distance as the capture distance (distance between the subject and the capture device 2) are created. According to such capture conditions, it is possible to suggest (instruct) setting the distance between the subject and the capture device 2 to the focus distance.

Note that, to allow the user to intuitively grasp the capture conditions, the capture conditions may include the direction and distance to which the capture device 2 should move in order to achieve the abovementioned capture distance (i.e., to capture the subject at the focus distance) (hereinafter, referred to as the direction and amount of movement of the capture device 2). In this case, the direction and amount of movement of the capture device 2 may be determined by comparing, for example, the focus distance included in the configuration information of the capture device 2 acquired in step S12 and the capture distance acquired in step S13.

Specifically, for example, in a case where the capture distance acquired in step S13 is longer than the focus distance, the direction of movement of the capture device 2 is forward (i.e., a direction approaching the subject). On the other hand, for example, in a case where the capture distance acquired in step S13 is shorter than the focus distance, the direction of movement of the capture device 2 is backward (i.e., a direction moving away from the subject).

Note that, in a case where the area of interest is extracted from the captured image (i.e., the subject is detected) when acquiring the capture distance, the direction of movement of the capture device 2 may be in a direction separated by a fixed angle, such as left or right, depending on the position of the area of interest (subject) on the captured image. Furthermore, the direction of movement of the capture device 2 may be at an angle (e.g.,)30° according to the position of the area of interest on the captured image, based on the direction of the capture device 2 when capturing the image. Furthermore, for example, if it is possible to determine the direction of the subject included in the area of interest based on the captured image, the direction of movement of the capture device 2 may be, for example, in a direction of a position at which the subject can be captured from the front (i.e., a capture angle with respect to the subject).

The amount of movement of the capture device 2 may also be an actual distance based on a difference between the focus distance and the capture distance, or may be a distance defined by a fixed interval, such as the number of steps or squares taken by the user of the capture device 2 (i.e., a unit serving as a reference when the user moves).

Furthermore, here, the direction and amount of movement of the capture device 2 are described as being included in the capture conditions. However, as long as the distance between the subject and the capture device 2 becomes close to the focus distance, the capture conditions may also include, for example, the direction and amount of movement of the subject.

Furthermore, the range (lower limit value and upper limit value) of the distance to the subject that can be measured with a certain accuracy using the statistical model changes based on the optical system (focus position, focal length, f-number, etc.) of the capture device 2. However, in step S14, the capture condition creation module 35 may estimate the range of the distance (hereinafter referred to as the distance measurable range) based on the configuration information of the capture device 2, and create the capture conditions based on the distance measurable range. In this case, the capture condition creation module 35 can suggest, for example, capture an image in a manner that the entire subject fits within the distance measurable range by creating the capture conditions including, for example, the estimated distance measurable range as the capture distance. In addition, such capture conditions may further include an angle of view, etc., necessary to fit the entire subject within the distance measurable range.

Furthermore, the capture conditions created in step S14 may include, instead of the capture distance described above, the configuration information of the capture device 2 and a setting value of the capture device 2 determined based on the capture distance. Note that the setting value of the capture device 2 may be, for example, the amount of change in the focus distance (focus position) such that the focus distance comes close to the current distance between the subject and the capture device 2 (i.e., the capture distance), or may be the focal length and f-number, etc., for changing the distance measurable range so that the position of the subject with respect to the capture device 2 is included in the distance measurable range.

The capture condition creation module 35 may be configured to create a capture condition including the capture distance (distance-related condition) and a capture condition including the setting value of the capture device 2 (optical system-related condition) mentioned above, and determine which of the two capture conditions takes priority. In this case, for example, in a case where the distance (difference between the focus distance and the current capture distance) at which the capture device 2 needs to be moved based on the capture distance is smaller than a predetermined value, the distance-related condition can be determined to have priority. On the other hand, in a case where, for example, the distance at which the capture device 2 needs to be moved based on the capture distance is equal to or greater than a predetermined value, the optical system-related condition can be determined to have priority. Furthermore, the capture condition to be prioritized may be determined based on the relationship between the angle of view in the optical system of the capture device 2 and the subject (e.g., whether the subject is appropriately included in the angle of view). In a case where there is a probability that changing the setting values of the capture device 2 may adversely affect capturing the image (e.g., white-out due to opening the aperture), the distance-related condition may be determined to be prioritized. Note that the capture condition to be prioritized may be specified, for example, by the user of the capture device 2.

After the processing in step S14 is executed, the output processing module 36 outputs the capture conditions created in step S14 (step S15).

The processing of step S15 is described below. In step S15, the output processing module 36 outputs, for example, the capture conditions to the output device 306 to present the capture conditions to the user (i.e., present conditions that encourage capturing suitable for measuring a distance).

For example, in a case where the output device 306 is a display, the capture conditions created in step S14 are displayed in a form that the user can understand.

Specifically, in a case where the capture conditions include the capture distance (i.e., focus distance), the output processing module 36 can display the capture distance superposed, for example, on the captured image.

Furthermore, in the case where the capture condition includes the direction and amount of movement of the capture device 2 to achieve the capture distance, for example, if the direction of movement of the capture device 2 is forward, and the amount of movement of the capture device 2 is 1 m, the output processing module 36 superposes an arrow indicating a forward direction (forward movement) on the captured image and displays "1 m" in the vicinity of the arrow. In this case, for example, a marker (a line-like figure) may also be arranged (displayed) at the position on the captured image where the distance estimated by the statistical model (distance converted from the bokeh value) is 1 m. This allows the user to intuitively grasp the position where the capture device 2 should move.

Here, the case where the capture condition includes the capture distance (direction and amount of movement of the capture device 2) has been described. However, in the case where the capture condition includes the setting value of the capture device 2, the setting value of the capture device 2 should be superposed and displayed on the captured image.

Note that the capture conditions need not be displayed on the image, but may be displayed, for example, on a distance map (a map in which each pixel is assigned a distance calculated for the pixel), or displayed in other manners.

Although the case where the output device 306 is a display is described here, in a case where the output device 306 is a speaker, the capture conditions may be output as audio and presented to the user.

That is, in the present embodiment, the capture conditions should be output (suggested) in a manner that can be grasped by the user.

Note that, although omitted in FIG. 20, the processing in the above steps S14 and S15 may, for example, be executed in a case where the difference between the focus distance included in the configuration information acquired in step S12 and the capture distance acquired in step S13 is greater than or equal to a predetermined value. In other words, the present embodiment may have a configuration in which the capture conditions are created and output in a case where the position of the subject is not near the focus position, and the capture conditions need to be changed. Note that, in a case where the difference between the focus distance included in the configuration information acquired in step S12 and the capture distance acquired in step S13 is not greater than or equal to the predetermined value, step S14 may be omitted, and it is to be presented (output) to the user that the capture conditions need not be changed in step S15.

In the case where the capture conditions are presented to the user by executing the processing in step S15 as described above, the user can change the current capture conditions (i.e., change the capture conditions to those suitable for measuring the distance) by referring to the capture conditions.

Specifically, in the case where the capture distance is included in the capture condition, the user can move the capture device 2 (or the subject) so as to achieve the capture distance. Furthermore, in the case where the focal length is included as the setting value of the capture device 2 in the capture condition, the user can change the focal length, for example, within the range set in the lens 21. However, the focal length may also be changed by replacing the lens 21. Furthermore, in a case where the f-number is included as the setting value of the capture device 2 in the capture condition, the user can change the f-number by driving (operating) the diaphragm mechanism described above.

In the case where the current capture conditions are changed to the capture conditions suitable for measuring the distance, the ranging device can measure the distance from the capture device 2 to the subject in the image in the image captured by the capture device 2 under the capture conditions. Note that the ranging device is to measure the distance to the subject using the same statistical model as the statistical model stored in the storage 31 described above.

Note that, here, it is explained that the capture conditions are presented to the user, and the user changes (improves) the capture conditions. However, the output processing module 36 may also output the capture conditions so that the current capture conditions are automatically changed to the capture conditions suitable for measuring the distance. That is, in the present embodiment, the capture conditions may be automatically changed based on (the suggested result of) the output capture conditions. Specifically, in the case where the capture distance (direction and amount of movement of the capture device 2) is included in the capture condition, and the capture device 2 is mounted on a moving mechanism that moves the capture device 2 autonomously, the capture condition may be output to the moving mechanism so that the capture device 2 may be automatically moved to a position where the capture distance included in the output capture condition can be achieved. Furthermore, in the case where the capture condition includes the setting value of the capture device 2, the capture condition may be output to the capture device 2 so that the current setting value of the capture device 2 is automatically changed to the setting value of the capture device 2.

By the way, when converting the bokeh value estimated in the above statistical model into a distance, it is necessary to calculate the distance using the focus distance. However, in the case where the focus distance is changed based on the capture conditions (setting value of the capture device 2), the changed focus distance is regarded as being re-set inside the capture device 2 (i.e., as the configuration information of the capture device 2). Note that the changed focus distance may be re-set by the user of the capture device 2, or may be automatically re-set based on information relating to the focus position (e.g., the position of the lens 21 or a control signal to drive the lens 21).

As described above, in the present embodiment, an image captured by the capture device 2 (an image affected by aberration of the optical system of the capture device 2) is acquired, configuration information of the capture device 2 (the optical system-related information of the capture device 2) is acquired, and a capture distance with respect to the image is acquired based on the acquired image. In addition, in the present embodiment, based on the configuration information of the capture device 2 and the capture distance, capture conditions (capture conditions of an image suitable for measuring the distance to a subject) are created, and the created capture conditions are output.

In the case where the capture conditions are output in this manner, the distance to the subject in the image is measured from the image captured by the capture device 2 in accordance with the capture conditions. Therefore, the accuracy of the distance measured by using the image can be improved.

Note that, in the present embodiment, since it is assumed that the ranging device uses the statistical model (a statistical model generated by learning the bokeh that occurs in an image affected by the aberration of the optical system of the capture device 2 and that changes nonlinearly according to the distance to the subject in the image) to measure the distance to the subject from the image affected by the aberration of the optical system of the capture device 2, the capture condition presentation device 3 creates (suggests) the capture conditions based on the capture distance acquired using the statistical model. However, the ranging device and the capture condition presentation device 3 may also be configured not to use the statistical model (i.e., to perform distance measurement based on aberration that do not depend on the statistical model).

In the present embodiment, the capture conditions including (the direction and distance in which the capture device 2 should move to achieve) the capture distance suitable for measuring the distance are created based on the configuration information of the capture device 2 and the capture distance with respect to the captured image. By doing so, the current position of the capture device 2 can be changed to an appropriate position (i.e., the capture device 2 can be moved) in order to capture an image suitable for measuring the distance to the subject.

In the present embodiment, the capture conditions including the setting values of the capture device 2 are created based on the configuration information of the capture device 2 and the capture distance with respect to the captured image, so that the current setting values of the capture device 2 can be changed to appropriate setting values in order to capture an image suitable for measuring the distance to the subject.

Note that the capture distance and the setting values of the capture device 2 described above can be determined based on the focus distance (distance to the position in focus in the image captured by the capture device 2) included in the configuration information of the capture device 2.

Furthermore, the present embodiment may have a configuration in which the capture conditions including the capture distance and the capture conditions including the setting values of the capture device 2 described above are created, and one of the capture conditions is preferentially output. According to such a configuration, the appropriate capture conditions are output (e.g., presented to the user) as the capture conditions, thereby improving convenience for the user to change the capture conditions.

In the present embodiment, it is mainly explained that one of the capture conditions including the capture distance and the setting values of the capture device 2 is output. However, the present embodiment may be configured to output (present) the capture conditions including both the capture distance and the setting values of the capture device 2. In such a configuration, the user can select the capture distance and the setting values of the capture device 2 included in the presented capture conditions to change the current capture conditions.

Note that, although the capture distance and the setting values of the capture device 2 are described here, the capture conditions may be created based on the distance measurable range (the range of distance from the capture device 2 to the subject that can be measured) estimated based on the configuration information of the capture device 2, as long as the statistical model is used to suggest capture conditions of the image suitable for measuring the distance to the subject.

Furthermore, in a case where the statistical model is constructed to output a bokeh value and the uncertainty level for the bokeh value by inputting an image in the present embodiment, the capture distance may be acquired based on the uncertainty level. According to such a configuration, it is possible to acquire a more accurate capture distance, and therefore, it is possible to create more appropriate capture conditions.

Furthermore, in the present embodiment, the distance converted from the bokeh value output from the statistical model by inputting the image captured by the capture device 2 to the statistical model is mainly described as being acquired as the capture distance. However, the capture distance may also be, for example, a distance obtained by converting the bokeh value output from the statistical model by inputting an area including a specific subject in an image captured by the capture device 2 into the statistical model. According to such a configuration, it is possible to, for example, obtain the capture distance based on the subject intended by the user. Therefore, appropriate capture conditions can be created to measure the distance to the subject based on the capture distance.

Furthermore, in the present embodiment, the configuration of presenting the capture conditions to the user of the capture device 2 enables the user to determine whether or not to adopt the capture conditions to measure the distance to the subject, and to intuitively capture an image that enables appropriate distance measurement based on the presented capture conditions.

Furthermore, in the present embodiment, the configuration may also be such that the current capture conditions are automatically changed to the capture conditions suitable for measuring the distance. According to such a configuration, it is possible to reduce the time and effort of the user to change the current capture conditions to those suitable for measuring the distance.

Note that, the present embodiment assumes a case in which one statistical model is stored in the storage 31. However, in the case where the capture device 2 is configured to be able to have the lens replaced as described above, a statistical model may be prepared for each lens (i.e., a lens that can be attached to the capture device 2) that can be used in the capture device 2 (i.e., the ranging device is configured to measure the distance to the subject using the statistical model corresponding to the lens). In this case, the capture condition presentation device 3 (and the ranging device) may be configured to use the configuration information (focal length, etc.) of the capture device 2 to select a statistical model for the lens attached to the capture device 2 and use the selected statistical model.

Furthermore, in the present embodiment, the capture condition presentation device 3 is described as including each of the modules 31 to 36. However, for example, the storage 31 may also be arranged in an external device different from the capture condition presentation device 3. In this case, the capture condition presentation device 3 may operate to use the statistical model acquired from the external device. Furthermore, the present embodiment may have a configuration in which some of the processing executed by, for example, each of the modules 32 to 36 is executed by the external device.

(Second Embodiment)

Next, a second embodiment is described. Note that, in the present embodiment, descriptions of the same parts as those of the first embodiment described above will be omitted, and parts different from those of the first embodiment will be mainly described.

Figure 21:
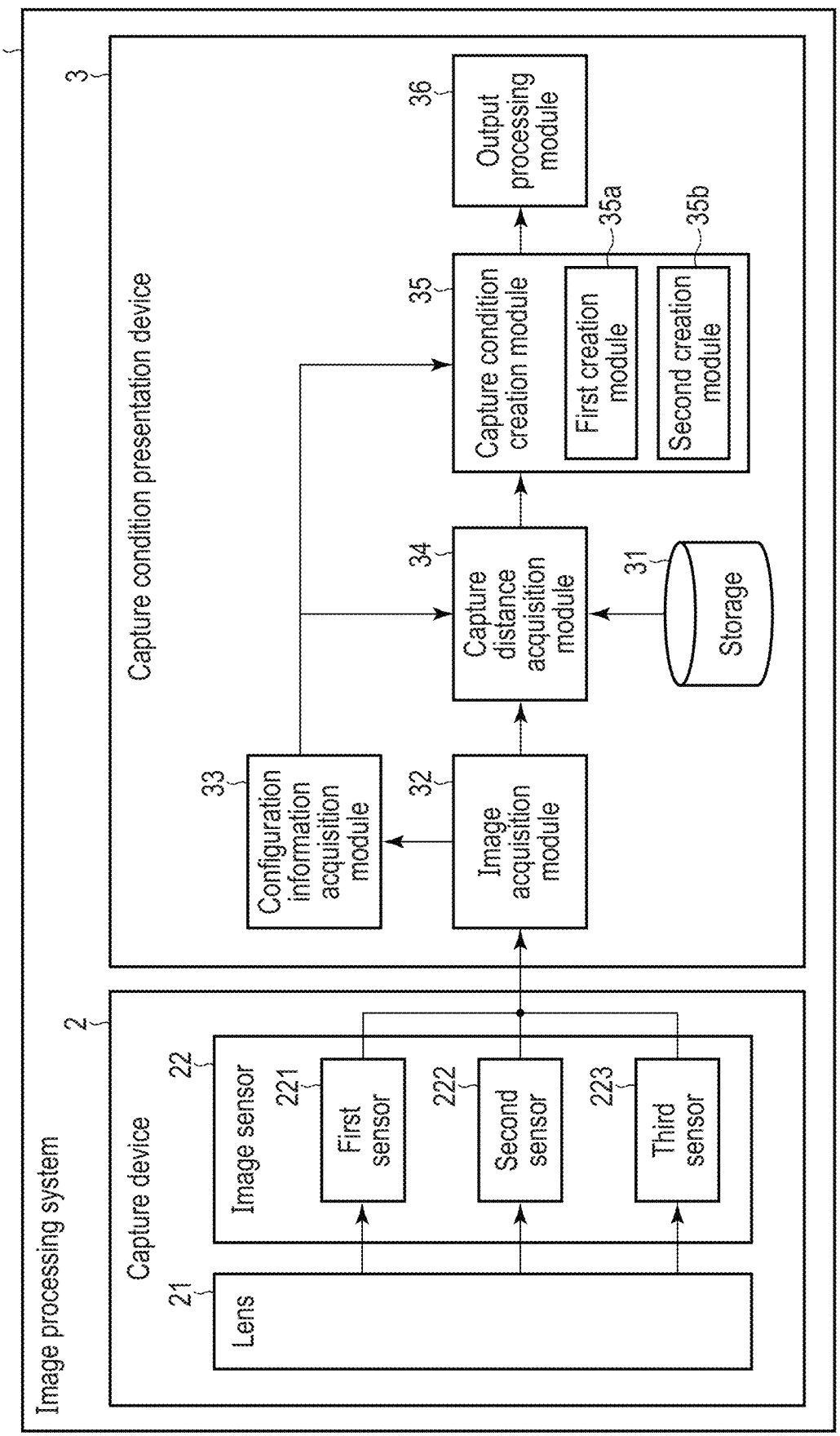
FIG. 21 shows an example of a configuration of an image processing system in a second embodiment.

FIG. 21 shows an example of a configuration of an image processing system in the present embodiment. In FIG. 21, the same parts as those in FIG. 1 described above will be denoted by the same reference symbols, detailed descriptions thereof will be omitted, and parts different from those in FIG. 1 will be described.

In the first embodiment mentioned above, the case is described in which the capture condition presentation device 3 is used to improve the capture conditions of an image when measuring the distance from a capture point to a subject using an image captured by the capture device 2. The distance to the subject measured from the image can be used to measure (estimate) the size of the subject in the image. Note that the process of measuring the size of the subject in the image can be executed by the ranging device described above, but may also be executed by other devices.

Therefore, a capture condition presentation device 3 according to the present embodiment differs from the first embodiment mentioned above in that, in addition to measuring the distance to the subject in the image as described above, it creates capture conditions that take into account measurement of the size of the subject.

As shown in FIG. 21, in the present embodiment, the capture condition creation module 35 includes a first creation module 35a and a second creation module 35b.

The first creation module 35a is a functional module similar to the capture condition creation module 35 included in the capture condition presentation device 3 of the first embodiment mentioned above. That is, the first creation module 35a creates capture conditions of an image suitable for measuring the distance to the subject (hereinafter referred to as a distance measurement condition) based on configuration information of a capture device 2 acquired by a configuration information acquisition module 33 and a capture distance acquired by a capture distance acquisition module 34.

The second creation module 35b creates capture conditions of an image suitable for measuring the size of the subject (hereinafter referred to as a size measurement condition) based on the configuration information of the capture device 2 acquired by the configuration information acquisition module 33 and the capture distance acquired by the capture distance acquisition module 34.

In the present embodiment, an output processing module 36 outputs at least one of the distance measurement condition created by the first creation module 35a and the size measurement condition created by the second creation module 35b.

Hereinafter, an example of the processing procedure of the capture condition presentation device 3 according to the present embodiment is described with reference to a flowchart of FIG. 22.

First, the processing in steps S21 to S23, which correspond to the processing in steps S11 to S13 shown in FIG. 20 above are executed.

Next, the first creation module 35a included in the capture condition creation module 35 creates the distance measurement condition based on the configuration information of the capture device 2 passed from the configuration information acquisition module 33 and the capture distance passed from the capture distance acquisition module 34 (step S24). Note that, since the processing in step S24 is similar to the processing in step S14 shown in FIG. 20, detailed descriptions thereof are omitted here.

The second creation module 35b included in the capture condition creation module 35 creates the size measurement condition based on the configuration information of the capture device 2 passed from the configuration information acquisition module 33 or the capture distance passed from the capture distance acquisition module 34 (step S25).

Here, in the case of measuring the size (actual size) of a subject in an image, if the subject is too far away from the capture device 2, the area occupied by the subject in the image becomes small (i.e., the subject is crushed), and the size of the subject cannot be measured with the desired resolution.

Therefore, in step S25, a size measurement condition that satisfies the required resolution is created based on this perspective.

Here, a case in which the width of a crack in a wall surface is measured from an image containing the crack is assumed. Note that the subject (here, the crack) to be an object of measuring the size in the image may, for example, be specified manually by the user or be detected (discriminated) automatically.

First, when assuming that the pixels indicating two points corresponding to two ends of the crack are end point a1 and end point a2, a width w of the crack, which corresponds to the distance from the end point a1 to the end point a2, is calculated by the following expression (2). Note that, although the actual crack width is obtained by combining horizontal and vertical components of the crack width, in the following description, the horizontal component of the crack width is simply referred to as the crack width for convenience.

$$w = \frac{Zs_x}{fr_x}\Delta x \qquad \text{(Expression 2)}$$

"Z" in expression (2) represents the distance (depth in actual scale) from the capture device 2 to the end point a1. "$s_x$" represents the horizontal size of an image sensor 22 (the entire image sensor) provided in the capture device 2. "f" represents the focal length in the optical system of the capture device 2. "$r_x$" represents the number of pixels (resolution) in the horizontal direction of the image captured by the capture device 2. "$\Delta x$" represents the number of pixels corresponding to the horizontal width of the crack. Note that, since the width of the crack is minute, in expression (2), a case in which the distance to the end point a1 is equal to the distance to the end point a2 is assumed. Note that the distance to the crack, which is estimated using a statistical model, is used as "Z" in expression (2). In addition, "$s_x$", "f", and "$r_x$" can be acquired from the configuration information of the capture device 2. Furthermore, "$\Delta x$" can be acquired based on an image captured by the capture device 2.

According to expression (2) above, it is possible to calculate the width of the crack in the image from the image captured by the capture device 2 and the configuration information of the capture device 2.

Here, in the present embodiment, it is necessary to create the size measurement condition that satisfies the required resolution in the crack width calculated by, for example, expression (2) above. Here, a case of measuring the crack width of one pixel in the image with a resolution of 0.1 mm is assumed. This means that when $\Delta x = 1$ (i.e., when $\Delta x$ is 1 pixel), the crack width w calculated in expression (2) is 0.1. Note that a horizontal size $s_x$ of the image sensor 22 and the number of horizontal pixels $r_x$ of the image captured by the capture device 2 are fixed values.

That is, to realize a resolution of 0.1 mm in the width of the crack measured from the image, it is necessary to adjust (determine) the distance Z to the crack and the focal length f in the optical system of the capture device 2 so that "w" in expression (2) becomes 0.1 (or less).

In this case, for example, in a case where the focal length in expression (2) is fixed to the focal length in the optical system of the current capture device 2 (i.e., the focal length in the configuration information of the capture device 2 obtained in step S22), the maximum value of the distance Z allowed to realize the resolution of 0.1 mm (i.e., the longest distance to the crack allowed) can be calculated from expression (2).

In this case, in step S25, the size measurement condition is created including the maximum value of distance Z calculated as described above (hereinafter referred to as the longest distance) as the capture distance.

Note that, here, it is explained that the size measurement condition is created including the longest distance as the capture distance. However, in the same manner as the improved capture condition described in the first embodiment mentioned above, the size measurement condition may also include the direction and distance (direction and amount of movement of the capture device 2) in which the capture device 2 should move to achieve the capture distance (i.e., to capture the subject from that longest distance). Note that since the direction and amount of movement of the capture device 2 are as described in the first embodiment mentioned above, a detailed explanation thereof is omitted here.

On the other hand, for example, in a case where the distance Z to the crack in expression (2) is fixed to the capture distance acquired in step S23 (the distance to the crack estimated using the statistical model), the minimum value of the focal length f allowed to realize the resolution of 0.1 mm (i.e., the shortest focal length allowed in the optical system of the capture device 2) can be calculated.

In this case, in step S25, the size measurement condition is created including the minimum value of focal length f calculated as described above (hereinafter referred to as the shortest focal length) as the setting value of the capture device 2.

Note that, in the present embodiment, one of the size measurement condition including the above-mentioned capture distance (longest distance) and the size measurement condition including the setting value of the capture device 2 (shortest focal length) is to be created. However, as in the first embodiment described above, the present embodiment may also be configured to create the size measurement condition including the capture distance and the size measurement condition including the setting value of the capture device 2, and determine which of the two size measurement conditions should be prioritized.

In the present embodiment, it is explained that if the subject (e.g., a crack in a wall surface) is too far away from the capture device 2, the size of the subject cannot be measured with the desired resolution. However, in a case where the capture device 2 is too close to the subject in order to increase the size of the subject in the image, the bokeh of the subject in the image becomes larger, and the accuracy of measuring the distance to the subject or the accuracy of detecting (discriminating) the subject in the image is reduced. In this case, as a result, the measurement accuracy of the size of the subject will also be affected. In other words, in the case of measuring the size of a minute subject such as a crack, for example, the measurement accuracy of the size may be reduced depending on the size of the bokeh occurred in the subject. Note that there are cases in which, for example, it is difficult to approach the subject due to the angle of view or obstacles; however, in such a case, the same applies to the case where the capture device 2 is too far from the subject.

Therefore, for example, in step S25, by further considering the bokeh value (bokeh value indicating bokeh that occurs on the subject) output from the statistical model to which the captured image was input when the processing of step S23 was executed, a size measurement condition may be created that includes the longest distance or shortest focal length at which the absolute value of the bokeh value (i.e., the size of the bokeh occurred in the subject) does not exceed the maximum value acceptable for measuring the size of the subject. Note that the maximum value of the absolute value of the bokeh value that is acceptable for measuring the size of the subject varies depending on the type or size of the subject, etc., and is to be set in advance according to the subject.

When the processing of step S25 is executed, the output processing module 36 compares the distance measurement condition created in step S24 and the size measurement condition created in step S25, and selects one of the distance measurement condition and the size measurement condition (i.e., the capture conditions) (step S26).

The output processing module 36 outputs the distance measurement condition or the size measurement condition selected in step S26 as the capture condition (step S27).

That is, in the present embodiment, one of the distance measurement condition created in step S24 and the size measurement condition created in step S25 is preferentially output.

The processing of steps S26 and S27 are explained below. First, in step S26, in the case where the distance measurement condition satisfies the size measurement condition, the distance measurement condition is to be selected. On the other hand, in the case where the distance measurement condition does not satisfy the size measurement condition, the size measurement condition is to be selected.

Specifically, for example, in the case where the distance measurement condition includes the focus distance and the size measurement condition includes the longest distance, in a case where the focus distance is less than or equal to the longest distance, the distance measurement condition is selected in step S26, and the distance measurement condition is output in step S27. According to this, it is possible to present a capture condition that is capable of improving the accuracy of measuring the distance to the subject and properly measuring the size of the subject.

On the other hand, in the case where the focus distance is longer than the longest distance, the size measurement condition is selected in step S26, and the size measurement condition is output in step S27. According to this, although it may not be possible to greatly improve the accuracy of measuring the distance to the subject, it is at least possible to present a capture condition that enables the size of the subject to be properly measured.

Furthermore, for example, in the case where the distance measurement condition includes the focal length as the setting value of the capture device 2 and the size measurement condition includes the shortest focal length as the setting value of the capture device 2, and the focal length included in the distance measurement condition is longer than the shortest focal length, the distance measurement condition is selected in step S26, and the distance measurement condition is output in step S27. On the other hand, in the case where the focal length included in the distance measurement condition is shorter than the shortest focal length, the size measurement condition is selected in step S26, and the size measurement condition is output in step S27.

Note that, in the case where the distance measurement condition is output in step S27, the same processing as in step S15 shown in FIG. 20 above is to be executed.

Even in the case where the size measurement condition is output in step S27, the same processing as in step S15 shown in FIG. 20 above is executed, thereby allowing the size measurement condition (capture distance or setting value of the capture device 2) to be output (presented) in various manners.

As described above, the present embodiment has a configuration in which the size measurement condition (a second capture condition of an image suitable for measuring the size of a subject) is created based on the configuration information of the capture device 2 and the capture distance with respect to the captured image, and in the case where the distance measurement condition does not satisfy the size measurement condition, the size measurement condition is output preferentially. This allows a capture condition to be presented (suggested) that satisfies the measurement accuracy of the size required in the case of measuring the size of a minute subject such as a crack on a wall surface.

In the case where the capture conditions are output in this manner, the size of the subject in the image is measured from the image captured by the capture device 2 in accordance with the capture conditions, thereby allowing the size of the subject to be appropriately measured using the image.

Furthermore, in the present embodiment, the size measurement condition is created based on the bokeh value indicating bokeh that occurs in the subject in the image, which is output from the statistical model by inputting the captured image into the statistical model. This suppresses the decline in measurement accuracy of the size of the subject caused by the increase in the size of the bokeh occurred in the subject.

Note that, in the present embodiment, it is explained that one of the distance measurement condition and the size measurement condition is preferentially output; however, the distance measurement condition and the size measurement condition may both be output (presented) so that an appropriate capture condition is selected by the user.

Furthermore, the distance measurement condition and the size measurement condition in the present embodiment may include one of the capture distance and the setting value of the capture device 2, or both the capture distance and the setting value of the image sensor 2.

Note that the capture conditions (at least one of the distance measurement condition and the size measurement condition) may be presented to the user, or the current capture conditions may be automatically changed to the capture conditions suitable for measuring the size of the subject, which is the same as in the first embodiment mentioned above.

(Application Example)

In each of the embodiments mentioned above, it has been explained that the capture device 2 captures images in accordance with the capture conditions output from the capture condition presentation device 3 to improve the measurement accuracy of the distance to the subject in the image and the measurement accuracy of the size of the subject. The following describes an application example in which a ranging device is used to measure the distance to a subject from an image captured by the capture device 2 and to execute the processing of measuring the size of the subject.

Figure 23:
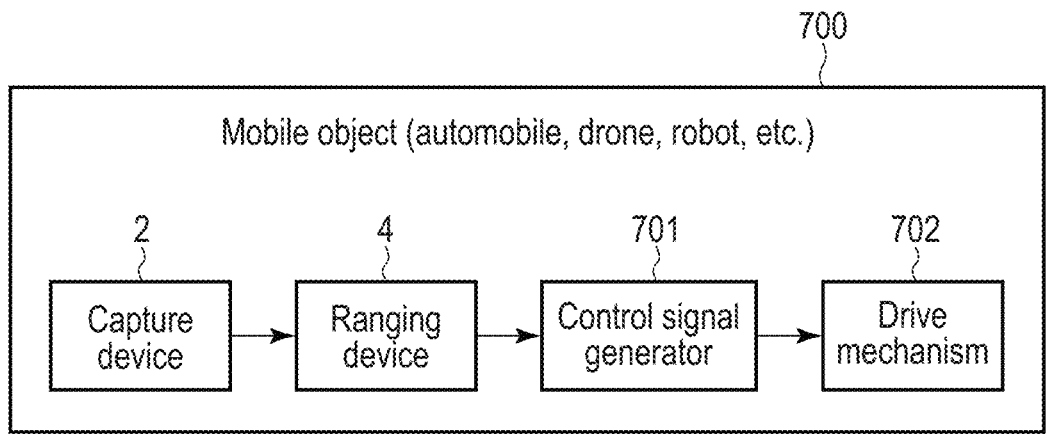
FIG. 23 shows an example of a functional configuration of a mobile object in which a capture device and a ranging device are incorporated.

FIG. 23 shows an example of a functional configuration of a mobile object 700 in which the capture device 2 and a ranging device 4 is incorporated.

The mobile object 700 can be realized, for example, as an automobile with an automatic driving function, an unmanned aircraft, an autonomous mobile robot, and the like. An unmanned aircraft is an airplane, rotary-wing aircraft, glider, or airship that cannot be manned and can be flown by remote control or autopilot, and includes, for example, drones (multicopters), radio-controlled aircraft, and helicopters for spraying agricultural chemicals. An autonomous mobile robot includes a mobile robot such as an automated guided vehicle (AGV), a cleaning robot for sweeping floors, a communication robot for providing various types of guidance to visitors, etc. The mobile object 700 includes not only those in which the robot body moves, but also industrial robots with a drive mechanism that moves or rotates a part of the robot, such as a robot arm.

Figure 24:
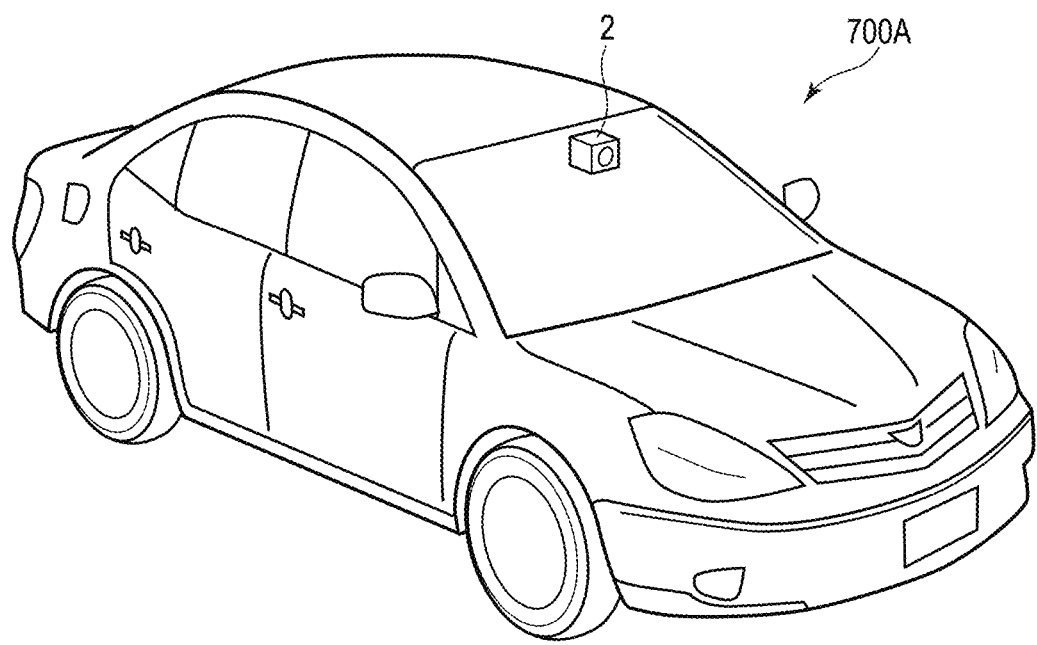
FIG. 24 illustrates a case in which the mobile object is an automobile.

As shown in FIG. 23, the mobile object 700 includes, for example, the capture device 2, the ranging device 4, a control signal generator 701, and a drive mechanism 702. The capture device 2 is installed in such a manner that it can capture an image of, for example, a subject in a traveling direction of the mobile object 700 or a part thereof. As shown in FIG. 24, in a case where the mobile object 700 is an automobile 700A, the capture device 2 is installed as a so-called front camera that captures an image of the front. Note that the capture device 2 may also be installed as a so-called rear camera that captures an image of the rear during backward movement.

Furthermore, a plurality of capture devices 2 may be installed as the front camera and the rear camera. Furthermore, the capture device 2 may be installed to also serve as a so-called drive recorder. That is, the capture device 2 may also be a recording device.

Figure 25:
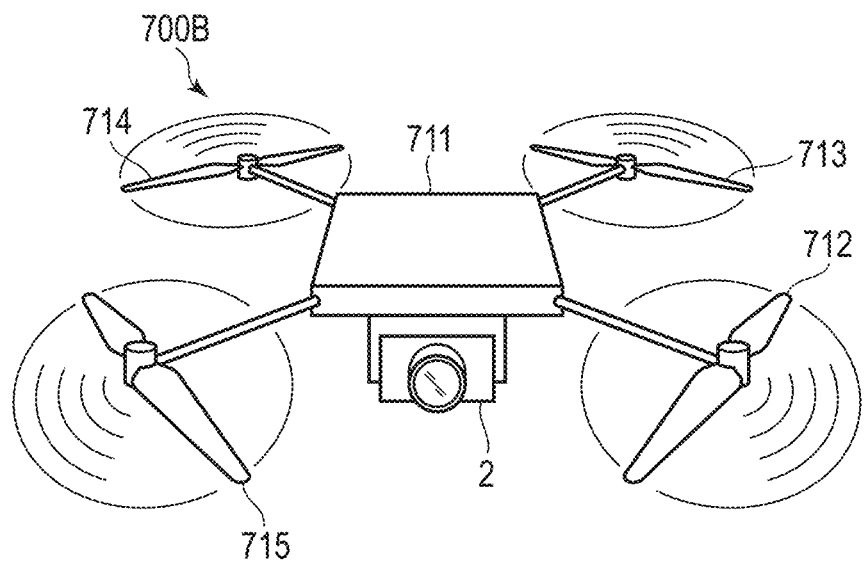
FIG. 25 illustrates a case in which the mobile object is a drone.

FIG. 25 shows an example of a case where the mobile object 700 is a drone 700B. The drone 700B includes a drone body 711 corresponding to the drive mechanism 702 and four propeller units 712 to 715. Each of the propeller units 712 to 715 has a propeller and a motor. When driving of the motor is transmitted to the propeller, the propeller rotates, and the drone 700B floats by the lift force generated by the rotation. The capture device 2 is mounted on, for example, a lower portion of the drone body 711.

Figure 26:
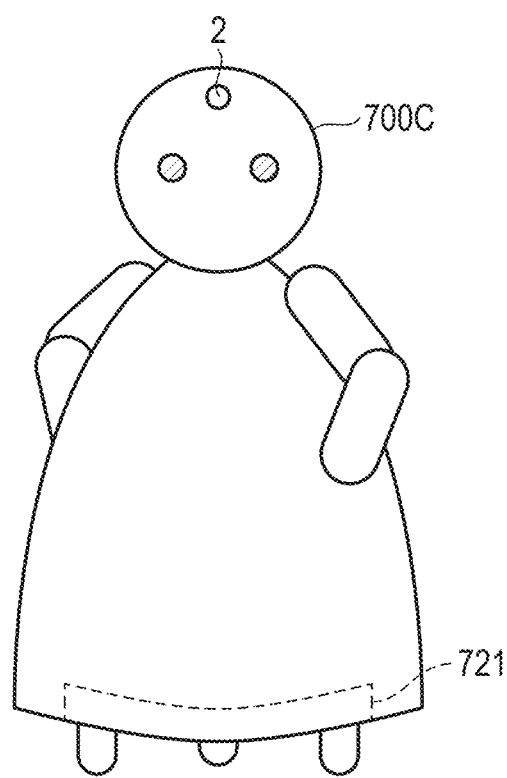
FIG. 26 illustrates a case in which the mobile object is an autonomous mobile robot.

FIG. 26 shows an example of a case in which the mobile object 700 is an autonomous mobile robot 700C. In a lower portion of the mobile robot 700C, a power unit 721 including a motor, wheels, etc., which corresponds to the drive mechanism 702, is provided. The power unit 721 controls a rotational speed of the motor and a direction of the wheels. When driving of the motor is transmitted, the wheels installed on a road surface or a floor surface rotate, and the direction of the wheels are controlled, thereby enabling the mobile robot 700C to move in any direction. In the example shown in FIG. 26, the capture device 2 is installed on, for example, a head of the mobile robot 700C in such a manner that it captures an image of the front of the humanoid mobile robot 700C. Note that the capture device 2 may also be installed to capture images of the rear, the left, and the right of the mobile robot 700C, or may be installed in multiple locations to capture images in multiple directions. Furthermore, it is also possible to perform dead reckoning by providing the capture device 2 in a small robot having a small space for mounting a sensor or the like and estimating a self-position, a posture, and a position of a subject.

Figure 27:
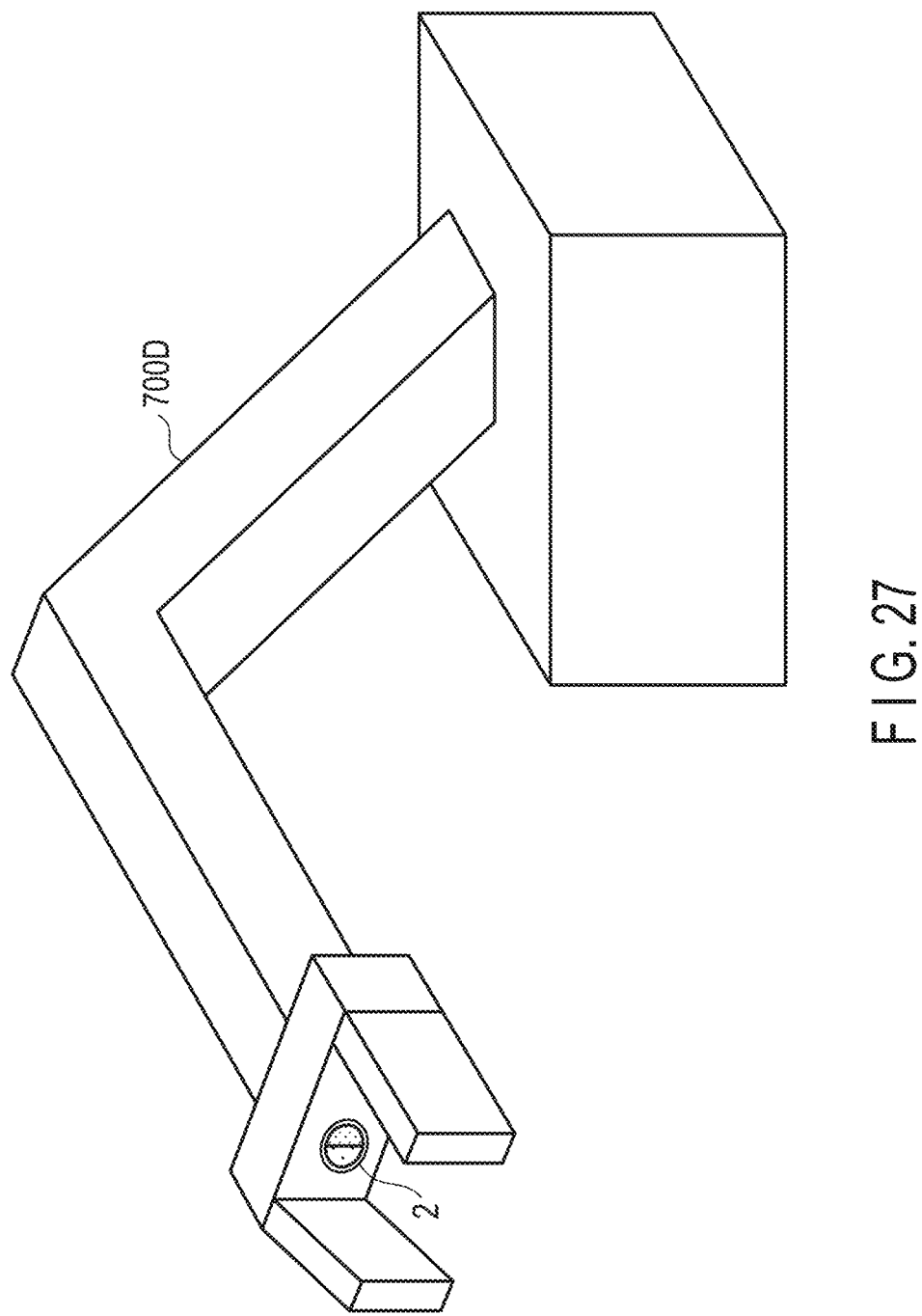
FIG. 27 illustrates a case in which the mobile object is a robot arm.

Note that, as shown in FIG. 27, in a case where the mobile object 700 is a robot arm 700D, and the movement and rotation of a part of the robot arm 700D are controlled, the capture device 2 may be installed at a distal end or the like of the robot arm 700D. In this case, an object to be gripped by the robot arm 700D is captured by the capture device 2, and the ranging device 4 is able to measure the distance to the object to be gripped by the robot arm 700D. As a result, the robot arm 700D can perform an operation of accurately gripping the object.

The control signal generator 701 outputs a control signal for controlling the drive mechanism 702 based on distance information indicating the distance to the subject output from the ranging device 4. The drive mechanism 702 drives the mobile object 700 or a part of the mobile object 700 in accordance with the control signal output from the control signal generator 701. For example, the drive mechanism 702 performs at least one of movement, rotation, acceleration, deceleration, adjustment of thrust (lift), a change in the traveling direction, switching between a normal driving mode and an automatic driving mode (collision avoidance mode), and activation of a safety device, such as an airbag, of the mobile object 700 or a part of the mobile object 700. For example, in a case where the distance to the subject is less than a threshold, the drive mechanism 702 may perform at least one of movement, rotation, acceleration, adjustment of thrust (lift), changing a direction to a direction approaching the object, and switching from the automatic driving mode (collision avoidance mode) to the normal driving mode.

Note that the drive mechanism 702 of the automobile 700A shown in FIG. 24 is, for example, a tire. The drive mechanism 702 of the drone 700B shown in FIG. 25 is, for example, a propeller. The drive mechanism 702 of the mobile robot 700C shown in FIG. 26 is, for example, a leg. The drive mechanism 702 of the robot arm 700D shown in FIG. 27 is, for example, a support unit that supports the distal end where the capture device 2 is installed.

The mobile object 700 may be further provided with a speaker or display to which information (distance information) relating to the distance to the subject output from the ranging device 4 is input. The speaker or display is wired or wirelessly connected to the ranging device 4 and is configured to output audio or images related to the distance to the subject. Furthermore, the mobile object 700 may include a light emitting unit to which information related to the distance to the subject output from the ranging device 4 is input and which can be turned on and off in accordance with the distance to the subject, for example.

In the case where the mobile object 700 is, for example, a drone 700B, when creating a map (three-dimensional shape of an object), performing structural survey of a building or terrain, or performing inspection of cracks, wire breaks, etc., from the sky, the capture device 2 acquires an image obtained by capturing a target, and determines whether or not the distance to a subject is greater than or equal to a threshold. Based on this determination result, the control signal generator 701 generates a control signal for controlling the thrust of the drone 700B such that the distance to the inspection target becomes constant. Here, it is assumed that the thrust includes lift. The drive mechanism 702 operates the drone 700B based on the control signal, so that the drone 700B can fly in parallel with the inspection target. In a case where the mobile object 700 is a drone 700B for monitoring, the control signal generator 701 may generate a control signal for controlling the thrust of the drone 700B to keep a constant distance from the object to be monitored.

Note that, in a case where the mobile object 700 (e.g., drone 700B) is used for maintenance and inspection of various infrastructures (hereinafter simply referred to as the infrastructure), the capture device 2 captures an image of a part in need of repair (hereinafter, referred to as a repair part) including a cracked part, a rusted part, or the like in the infrastructure, so that a distance to the repaired part can be obtained. In this case, a size of the repair part can be calculated from the image by using the distance to the repair part. As a result, for example, the repair part is displayed on a map representing the entire infrastructure so that a maintenance inspector of the infrastructure can recognize the repair part. In addition, it is also useful to notify the maintenance inspector of the size of the repair part in advance in order to perform smooth repair work.

Note that, here, a case in which the mobile object 700 (for example, the drone 700B) in which the ranging device 4 is incorporated is used for maintenance and inspection of infrastructure, etc., is described. However, for example, in a case where the ranging device 4 is realized as a smartphone or the like on which the capture device 2 is mounted, for example, the maintenance inspector can use the smartphone to capture an image of the repair part to perform maintenance and inspection of the infrastructure. Furthermore, in a case where the capture device 2 is realized as a smartphone or the like, the maintenance inspector can realize the same maintenance and inspection by uploading the image of the repair part captured by the smartphone to the ranging device 4.

When uploading the image, for example, by using a method of transferring the image to the ranging device 4 (server device) via a network, inspection work can be easily performed at the site of maintenance and inspection.

Furthermore, during flight of the drone 700B, the capture device 2 acquires an image obtained by capturing a ground direction, and determines whether or not a distance to the ground is equal to or greater than a threshold. The control signal generator 701 generates a control signal for controlling the thrust of the drone 700B such that a height from the ground becomes a designated height based on this determination result. The drive mechanism 702 operates the drone 700B based on the control signal, so that the drone 700B can fly at the designated height. If the drone 700B is a pesticide application drone, the pesticide can be easily evenly applied since the height of the drone 700B from the ground is kept constant in this manner.

Furthermore, in the case where the mobile object 700 is the automobile 700A or the drone 700B, the capture device 2 captures an image of an automobile at the front or a surrounding drone during regimental travel of the automobile 700A or cooperative flight of the drone 700B, and determines whether or not the distance to the automobile or the drone is greater than or equal to a threshold. Based on this determination result, the control signal generator 701 generates a control signal for controlling the speed of the automobile 700A or the thrust of the drone 700B so that a distance to the automobile at the front or the surrounding drone becomes constant. The drive mechanism 702 operates the automobile 700A and the drone 700B based on the control signal, so that the regimental travel of the automobile 700A or the cooperative flight of the drone 700B can be easily performed.

Furthermore, in the case where the mobile object 700 is the automobile 700A, it may be configured such that an instruction of a driver can be received via a user interface such that the driver of the automobile 700A can set (change) a threshold. As a result, the driver can drive the automobile 700A at an inter-vehicle distance the driver prefers. Furthermore, the threshold may be changed according to the speed of the automobile 700A in order to maintain a safe inter-vehicle distance from the automobile at the front. The safe inter-vehicle distance depends on the speed of the automobile 700A. Therefore, the faster the speed of the automobile 700A, the larger (longer) the threshold can be set.

Furthermore, in the case where the mobile object 700 is the automobile 700A, a predetermined distance in the traveling direction may be set to a threshold, and a control signal may be generated to activate a brake or a safety device such as an airbag when an object appears before the threshold. In this case, the safety device such as an automatic brake and an airbag is provided in the drive mechanism 702.

According to at least one embodiment described above, it is possible to provide an image processing device, a method, and a program capable of improving accuracy of a distance that is measured using an image.

Each of the various functions described in the present embodiment may be realized by a circuit (processing circuit). Examples of the processing circuit include a programmed processor, such as a central processing unit (CPU). This processor executes each of the described functions by executing a computer program (instruction set) stored in a memory. This processor may be a microprocessor that includes an electrical circuit. Examples of the processing circuit include a digital signal processor (DSP), an application-specific integrated circuit (ASICs), a microcontroller, a controller, and other electrical circuit components. Each of the other components other than the CPU described in the present embodiment may also be realized by the processing circuit.

Furthermore, the various processes of the present embodiment can be implemented by a computer program, and thus, the same effects as those of the present embodiment can be easily implemented only by installing and executing the computer program in a computer through a computer-readable storage medium storing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device which is used when measuring a capture distance from a capture device to a subject in an image using an image captured by the capture device and affected by aberration of an optical system of the capture device, the image processing device comprising:
    a processor configured to:
      acquire an image captured by the capture device;
      acquire configuration information relating to an optical system of the capture device;

acquire a capture distance with respect to the image based on the acquired image;

create a first capture condition of an image suitable for measuring a distance to the subject based on the acquired configuration information and the acquired capture distance; and output the created first capture condition, wherein the processor is configured to create, based on the acquired configuration information and the acquired capture distance, a first capture condition comprising a direction and distance in which the capture device should move to achieve a capture distance suitable for measuring a distance to the subject, and a second capture condition of an image suitable for measuring a size of the subject, the second capture condition comprises a longest capture distance from the capture device to the subject that is capable of estimating the size of the subject in the acquired image, and the processor is configured to preferentially output the second capture condition in a case where the first capture condition does not satisfy the second capture condition.

2. The image processing device of claim 1, wherein the acquired configuration information comprises a distance to a position in focus in an image captured by the capture device.

3. The image processing device of claim 1, further comprising storage configured to store a statistical model generated by learning bokeh that occurs in an image affected by aberration of an optical system of the capture device, and that changes nonlinearly according to a distance to a subject in the image, wherein the processor is configured to acquire, as the capture distance, a distance to the subject in the image, which is converted from a bokeh value indicating bokeh occurred in the subject in the image, the bokeh value output from the statistical model by inputting the acquired image in the statistical model.

4. The image processing device of claim 3, wherein the statistical model is constructed to further output an uncertainty level with respect to a bokeh value output from the statistical model by inputting the acquired image in the statistical model, and the processor is configured to acquire the capture distance based on the uncertainty level output from the statistical model.

5. The image processing device of claim 3, wherein the processor acquires, as the capture distance, a distance to the subject, which is converted from a bokeh value indicating bokeh occurred in the subject, the bokeh value output from the statistical model by inputting an area including the subject in the acquired image to the statistical model.

6. The image processing device of claim 1, further comprising storage configured to store a statistical model generated by learning bokeh that occurs in an image affected by aberration of an optical system of the capture device, and that changes nonlinearly according to a distance to the subject in the image, wherein the processor is configured to create the second capture condition based on a bokeh value indicating bokeh occurred in a subject in the image, the bokeh value output from the statistical model by inputting the acquired image to the statistical model.

7. The image processing device of claim 1, wherein the processor is configured to present the first capture condition to a user using the capture device.

8. The image processing device of claim 1, wherein the processor is configured to present the second capture condition to a user using the capture device.

9. The image processing device of claim 1, wherein the processor is configured to output the first capture condition so that a current capture condition is automatically changed to the first capture condition.

10. The image processing device of claim 1, wherein the processor is configured to output the second capture condition so that a current capture condition is automatically changed to the second capture condition.

11. A method executed by an image processing device used when measuring a capture distance from a capture device to a subject in an image, using an image captured by the capture device and affected by aberration of the optical system of the capture device, the method comprising:

acquiring an image captured by the capture device;

acquiring configuration information relating to the optical system of the capture device;

acquiring a capture distance with respect to the image based on the acquired image;

creating, based on the acquired configuration information and the acquired capture distance, a capture condition of an image suitable for measuring a distance to the subject; and outputting the created capture condition, wherein the creating includes creating, based on the acquired configuration information and the acquired capture distance, a first capture condition comprising a direction and distance in which the capture device should move to achieve a capture distance suitable for measuring a distance to the subject, and a second capture condition of an image suitable for measuring a size of the subject, the second capture condition comprises a longest capture distance from the capture device to the subject that is capable of estimating the size of the subject in the acquired image, and the outputting includes preferentially outputting the second capture condition in a case where the first capture condition does not satisfy the second capture condition.

12. A non-transitory computer-readable storage medium having stored thereon a program which is executed by a computer of an image processing device used when measuring a capture distance from a capture device to a subject in an image, using an image captured by the capture device and affected by aberration of the optical system of the capture device, the program comprising instructions capable of causing the computer to execute functions of:

acquiring the image captured by the capture device;

acquiring configuration information relating to the optical system of the capture device;

acquiring, based on the acquired image, a capture distance with respect to the image;

creating, based on the acquired configuration information and the acquired capture distance, a capture condition of an image suitable for measuring a distance to the subject; and outputting the created capture condition, wherein the creating includes creating, based on the acquired configuration information and the acquired capture distance, a first capture condition comprising a direction and distance in which the capture device should move to achieve a capture distance suitable for measuring a distance to the subject, and a second capture condition of an image suitable for measuring a size of the subject, the second capture condition comprises a longest capture distance from the capture device to the subject that is capable of estimating the size of the subject in the acquired image, and the outputting includes preferentially outputting the second capture condition in a case where the first capture condition does not satisfy the second capture condition.

\* \* \* \* \*